United States Patent
Ito

(10) Patent No.: US 7,787,084 B2
(45) Date of Patent: Aug. 31, 2010

(54) OPTICAL COMPENSATION FILM, POLARIZING PLATE AND LIQUID CRYSTAL DISPLAY DEVICE

(75) Inventor: Yoji Ito, Kanagawa (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 823 days.

(21) Appl. No.: 11/730,307

(22) Filed: Mar. 30, 2007

(65) Prior Publication Data

US 2007/0229740 A1   Oct. 4, 2007

(30) Foreign Application Priority Data

Mar. 31, 2006   (JP) .............................. 2006-100206

(51) Int. Cl.
*G02F 1/1335*   (2006.01)

(52) U.S. Cl. ...................................... 349/117

(58) Field of Classification Search .................. 349/117
See application file for complete search history.

(56) References Cited

U.S. PATENT DOCUMENTS 6,912,029 B2 *   6/2005   Tanaka ........................ 349/118

2005/0150426 A1 *   7/2005   Hashimoto et al. ...... 106/170.21
2010/0026940 A1 *   2/2010   Takegami et al. ............ 349/102

FOREIGN PATENT DOCUMENTS

| EP | 0 911 656 A2 | 4/1999 |
| JP | 07-191217 A | 7/1995 |
| JP | 09-211444 A | 8/1997 |
| JP | 11-316378 A | 11/1999 |
| JP | 3284002 B2 | 5/2002 |
| JP | 3629082 B2 | 3/2005 |
| JP | 3842472 B2 | 11/2006 |

* cited by examiner

*Primary Examiner*—Sung H Pak
(74) *Attorney, Agent, or Firm*—Buchanan Ingersoll & Rooney PC

(57) ABSTRACT

Provided are a liquid crystal display device, in particular, an optical compensation film and a polarizing plate having an excellent optical compensation function for OCB mode liquid crystal display device which has a rapid response speed and a suitability for moving images and capable of further contributing to thinning the liquid crystal display device, as well as the OCB mode liquid crystal display device having a high display grade, the rapid response speed, the suitability for moving images and a high transmittance. For this purpose, a roll-shaped lengthy optical compensation film wherein values of Re(0°), Re(40°) and Re(−40°) thereof are in the ranges of 37±6 nm, 50±6 nm and 124±12 nm, respectively is provided.

12 Claims, No Drawings

OPTICAL COMPENSATION FILM, POLARIZING PLATE AND LIQUID CRYSTAL DISPLAY DEVICE

BACKGROUND OF THE INVENTION

1. Field of the Invention

The present invention relates to optical compensation films, polarizing plates and liquid crystal display devices.

2. Description of the Related Art

Optical compensation films produced by highly orienting a liquid crystal compound and fixing it have been recently developed for various uses such as optical compensation films and luminance enhanced films for liquid crystal display devices and optical compensation films for projection display apparatuses, and among them, growth as the optical compensation film for the liquid crystal display device is remarkable.

Typically, the liquid crystal display devices comprise polarizing plates and liquid crystal cells. In TFT liquid crystal display devices of TN mode which being most popular currently, optical compensation films are inserted between polarizing plates and the liquid crystal cells to realize liquid crystal display devices having a high display grade.

However, in this constitution, thickness of the liquid crystal display device itself becomes thick, and a request to make it thin could not be sufficiently satisfied.

For example, in the inventions described in Japanese Patent Application Laid-Open (JP-A) No. 07-191217 and European Patent Application Publication No. 0911656, problems in terms of view angles are solved without making the liquid crystal display device thick by directly using an optical compensation film obtained by applying an optically anisotropic layer formed from a discotic compound on a transparent support as a protection firm of the polarizing plate.

This way, the optical compensation film has been developed for the liquid crystal display device with the TN mode which is the current mainstream, but recently, demands for liquid crystal television have been increased, and it has been pointed out that there is a problem in response speed, e.g., a tailing phenomenon occurs in moving images.

In the inventions described in JP-A Nos. 09-211444 and 11-316378, the moving image is addressed by applying the optical compensation film having a layer composed of a liquid crystal compound to the liquid crystal display device with an OCB mode.

However, it is required for use in the liquid crystal televisions that high contrast is kept and reduced contrast due to a visual angle is lost. Thus, it has been difficult to obtain a proper front contrast by only controlling optical parameters known conventionally.

In recent years, it has been required for the liquid crystal televisions to consume a low electric power. Thus, it has been necessary to keep the high contrast and the wide view angle and further accomplish a high transmittance.

Therefore, various technologies for solving the above problems have been proposed, but it is an actual circumstance that no liquid crystal display device which keeps the high contrast and the wide view angle and further accomplishes the high transmittance is provided yet.

BRIEF SUMMARY OF THE INVENTION

The present invention aims at solving the conventional problems and accomplishing the following objects. That is, it is an object of the present invention to provide an optical compensation film having an excellent optical compensation function for a liquid crystal display device, particularly the liquid crystal display device with an OCB mode having a fast response speed and a moving-image fitness.

It is another object of the present invention to provide a polarizing plate having a polarization function, as well as having an excellent optical compensation function to a liquid crystal display device, particularly the liquid crystal display device with an OCB mode having a fast response speed and a moving-image fitness, and capable of further contributing to thinning the liquid crystal display device.

Further, it is another object of the present invention to provide a liquid crystal display device capable of displaying an image having an high display grade, particularly the liquid crystal display device with an OCB mode having a fast response speed, a moving-image fitness and a high transmittance.

The problems described above may be solved by the present invention as follows:

In an aspect of the present invention, an optical compensation film is provided that comprises a longitudinal direction and an in-plane refractive-index-reducing direction, wherein the optical compensation film satisfies the following optical properties within a plane through which the normal line of the optical compensation film and the direction of 45° inclined from the longitudinal direction toward the in-plane refractive-index-reducing direction pass:

(i) a retardation value Re(0°) measured in the normal line direction using a light of wavelength 550 nm is in a range of 37±6 nm;

(ii) a retardation value Re(40°) measured in a direction inclined 40°, toward the plane of the optical compensation film, from the normal line using a light of wavelength 550 nm is in a range of 50±6 nm; and (iii) a retardation value Re(−40°) measured in a direction inclined 40°, to the direction opposite to the direction of (ii), from the normal line using a light of wavelength 550 nm is in a range of 124±12 nm.

Preferably, the optical compensation film further comprises a support and an optically anisotropic layer that comprises an orientation-fixed liquid crystal compound.

Preferably, the support has an in-plane slow axis other than orthogonal or parallel with the in-plane slow axis of the optically anisotropic layer.

Preferably, the support has an A1 value, calculated from the following Formula (1), in a range of 0.10 to 0.95, and an A2 value, calculated from the following Formula (2), in a range of 1.01 to 1.50;

$$A1 \text{ value} = Re_{(450)}/Re_{(550)} \qquad \text{Formula (1)}$$

$$A2 \text{ value} = Re_{(650)}/Re_{(550)} \qquad \text{Formula (2)},$$

wherein $Re_{(450)}$ is an in-plane retardation value of the support for a light of wavelength 450 nm, $Re_{(550)}$ is an in-plane retardation value of the support for a light of wavelength 550 nm, and $Re_{(650)}$ is an in-plane retardation value of the support for a light of wavelength 650 nm.

In another aspect of the present invention, a method for producing a polarizing plate is provided that comprises laminating the optical compensation film described above, which being formed into a roll shape, with a polarizing film in a way of roll-to-roll.

In another aspect of the present invention, a polarizing plate is provided that is produced by the method described above.

In another aspect of the present invention, a liquid crystal display device is provided that comprises the polarizing plate described above, and a liquid crystal cell, having a liquid crystal layer, that is oriented in OCB mode.

In another aspect of the present invention, a liquid crystal display device is provided that comprises the polarizing plate described above, and a liquid crystal cell, having a liquid crystal layer, that is oriented in HAN mode.

DETAILED DESCRIPTION OF THE INVENTION

The optical compensation film, the polarizing plate and the liquid crystal display device using the same according to the present invention will be described in detail below.

In the description of present embodiments, "45°", "parallel" or "orthogonal" means falling in the range of an exact angle±less than 5°. A disagreement from the exact angle is preferably less than 4° and more preferably less than 3°.

For the angle, "+" means a clockwise direction and "−" means an anticlockwise direction.

The "slow axis" means the direction which maximizes the refractive index. A "visible light region" refers to the wavelength of 380 nm to 780 nm.

Furthermore, the wavelength at which the refractive index being measured is the visible light region ($\lambda=550$ nm) unless otherwise specified.

The "polarizing plate" described in the present embodiments is used in the meaning including both of a polarizing plate long sheet and a polarizing plate cut into a size incorporated in the liquid crystal display device, unless otherwise specified. The "cutting" referred to here includes "punching" and "cutting out".

In the description of the present embodiments, the "polarizing film" and the "polarizing plate" are distinctively used, and the "polarizing plate" means a laminated body having a transparent protection film which protects the polarizing film on at least one side of the "polarizing film".

In the description of the present embodiments, a "molecular symmetry axis" indicates a rotational symmetry axis when a molecule has the rotational symmetry axis, but it is not required in a strict sense that the molecule is rotationally symmetric.

In general, in the discotic liquid crystal compound, the molecular symmetry axis is matched to a perpendicular axis against a discotic face which penetrates a center of the discotic face. In a rod-like liquid crystal compound, the molecular symmetry axis is matched to a major axis of the molecule.

Optical Compensation Film

Properties of Optical Compensation Film

In the optical compensation film of the present invention, it is preferable that the values of Re(0°), Re(40°) and Re(−40°) measured by an ellipsometer are in the ranges of 37±6 nm, 50±6 nm and 124±12 nm, respectively, in order to improve the view angle of the liquid crystal display device, particularly the liquid crystal display device with the OCB mode or HAN mode.

Here, Re(0°), Re(40°) and Re(−40°) represent the retardation values of the optically anisotropic layer measured, within a plane through which the in-plane refractive-index-reducing direction (fast-axis direction) on the basis of the longitudinal direction and the normal line of the optical compensation film pass, in the normal line direction, in a direction inclined 40° toward the plane of the film from the normal line, and in a direction inclined 40° to the direction opposite to that of (ii) from the normal line, using a light of wavelength 550 nm.

In the liquid crystal display device with a birefringence mode typified by the OCB mode and the HAN mode, the arrangement of liquid crystal molecules in the liquid crystal cells is very complicated, and the optical compensation film optimal for the compensation of the view angle cannot be obtained from conventional refractive index elliptic bodies.

As a result of extensive studies, the present inventors have found that there is a correlation between the retardation value in various visible angles of the optical compensation film and a contrast view angle in the liquid crystal display device.

Furthermore, the present inventors have found that the retardation values of the optical compensation film measured from the normal line direction, from the direction inclined at 40° in the direction of 45° from the normal line and from the direction conversely inclined at 40° from the normal line in the plane including the direction which is 45° in which the in-plane refractive index is reduced against the longitudinal direction, and the normal line in the roll-shaped long sheet optical compensation film are correlated well with the view angles in the liquid crystal display device when the optical compensation film is integrated with the polarizing plate.

It has also been found that to realize the high transmittance of the liquid crystal display device with keeping the contrast and the view angle, Re(0°) and Re(40°), and Re(−40°) are closely related.

It is also preferable that no direction to be "0" is present when the retardation value is measured from any direction in the optical compensation film of the present invention, which has no optic axis.

Constitution of Optical Compensation Film

The optical compensation film of the present invention has a laminated structure of at least two or more layers, and has at least a support and an optically anisotropic layer provided on the support.

Support

The support used for the present invention is preferably transparent, and specifically a transparent polymer film having a light transmittance of 80% or more is preferable. The polymer film which can be used as the support includes polymer films composed of cellulose ester (e.g., cellulose acetate, cellulose diacetate), norbornene based polymer and polymethyl methacrylate. Commercially available polymers (Arton®) in the norbornene based polymer, and Zeonex®) may be used. Among them, the film composed of cellulose ester is preferable, and the film composed of lower fatty acid ester of cellulose is more preferable. The lower fatty acid means the fatty acid having 6 or less carbon atoms. In particular, those having 2 carbon atoms (cellulose acetate), 3 carbon atoms (cellulose propionate) and 4 carbon atoms (cellulose butyrate) are preferable.

Among them, the film composed of cellulose acetate is particularly preferable. Mixed fatty acid ester such as cellulose acetate propionate and cellulose acetate butyrate can also be used.

Even in the polymers such as polycarbonate and polysulfone conventionally known, which easily express the birefringence, if the expression of the birefringence is controlled by modifying the molecule as described in International Publication WO00/26705 Pamphlet, they can also be used as the support in the present invention.

When the optical compensation film of the present invention is used as the protection film or a phase contrast film of the polarizing plate, it is preferable to use cellulose acetate having an acetylation degree of 55.0% to 62.5%. It is more preferable to have the acetylation degree of 57.0% to 62.0%. Here, the acetylation degree means a bound acetic acid amount per cellulose unit.

The acetylation degree is obtained by measurement and calculation of an acetylation level in ASTM: D-817-91 (test method of cellulose acetate).

A viscosity average polymerization degree (DP) of cellulose acetate is preferably 250 or more and more preferably 290 or more. It is preferable that cellulose acetate has a narrow molecular weight distribution of Mw/Mn (Mw: mass average molecular weight, Mn: number average molecular weight) obtained by gel permeation chromatography.

Specifically, the Mw/Mn value is preferably 1.0 to 40, more preferably 1.0 to 1.65 and particularly preferably 1.0 to 1.6.

In cellulose acetate, hydroxyl groups at positions 2, 3 and 6 of cellulose are not evenly substituted, and a substitution degree at position 6 tends to become low.

In the polymer film used as the support, it is preferable that the substitution degree at position 6 of cellulose is equal to or higher than those at positions 2 and 3.

A rate of the substitution degree at position 6 is preferably 30% to 40%, more preferably 31% to 40% and particularly preferably 32% to 40% based on the total substitution degree at positions 2, 3 and 6. The substitution degree at position 6 is preferably 0.88 or more. The substitution degree at each position can be measured by NMR.

Cellulose acetate having the high substitution degree at position 6 can be synthesized with reference to Synthesis Example 1 described in paragraph numbers [0043] to [0044], Synthesis Example 2 described in paragraph numbers [0048] to [0049] and Synthesis Example 3 described in paragraph numbers [0051] to [0052] in JP-A No. 11-5851.

Retardation value Re and retardation value Rth of supports are defined in the following formulae (I) and (II), respectively. In the following formulae (I) and (II), nx indicates a refractive index of a slow axis direction (direction where the refractive index becomes the maximum) in a film plane, ny indicates a refractive index of a fast axis direction (direction where the refractive index becomes the minimum) in the film plane, nz indicates a refractive index in a thickness direction of the film, and d indicates a thickness of the film whose unit is nm.

$$Re = (nx - ny) \times d \quad \text{Formula (I)}$$

$$Rth = \{(nx+ny)/2 - nz\} \times d \quad \text{Formula (II)}$$

In the case of the support having the slow axis in the plane of the present invention, the retardation value Re is preferably 20 nm to 150 nm, more preferably 25 nm to 100 nm and particularly preferably 30 nm to 60 nm.

When two of the optical compensation films of the present invention using cellulose acetate are incorporated as the support in the liquid crystal display device, the retardation value Rth is preferably 150 nm to 250 nm, more preferably 170 nm to 210 nm and particularly preferably 180 nm to 200 nm.

A birefringence index ($\Delta n$: nx−ny) of the cellulose acetate film is preferably 0.00025 to 0.00088. The birefringence index $\{(nx+ny)/2-nz\}$ in the thickness direction of the cellulose acetate film is preferably 0.00088 to 0.005.

A1 value defined by the following formula (1) in the optical compensation film of the present invention is preferably 0.10 to 0.95, more preferably 0.3 to 0.8 and particularly preferably 0.5 to 0.75.

A2 value defined by the following formula (2) is preferably 1.01 to 1.50, more preferably 1.10 to 1.45 and particularly preferably 1.20 to 1.40.

In the following formulae (1) and (2), $Re_{(450)}$ is the retardation value of the film for the light of wavelength 450 nm, $Re_{(550)}$ is the retardation value of the film for the light of wavelength 550 nm, and $Re_{(650)}$ is the retardation value of the film for the light of wavelength of 650 nm.

$$A1 \text{ value} = Re_{(450)}/Re_{(550)} \quad \text{Formula (1)}$$

$$A2 \text{ value} = Re_{(650)}/Re_{(550)} \quad \text{Formula (2)}$$

As the method of controlling the Re of the optical compensation film of the present invention, the method of drawing a transparent polymer film at a temperature of 25° C. to 100° C. of a glass transition point of the polymer is preferably used.

Meanwhile, the transmittance of the optical compensation film is preferably 85% or more and more preferably 90% or more. By applying a drawing method adapted to the present invention, even when the same material is used, it is possible to obtain the optical compensation film having the higher transmittance. The present inventors have speculated that impurities in the polymer material is volatized to reduce scattering factors in the film by drawing at very high temperature.

A mechanism in which the Re at each wavelength becomes the desired value by drawing at high temperature will be described using cellulose acylate which is a particularly preferable aspect as an example.

Cellulose acylate is formed from a backbone composed of a glucopyranose ring and a side chain composed of an acyl group. When the film composed of cellulose acylate is drawn, the backbone is inclined to the drawing direction to express the Re. As a result of the extensive study, the present inventors have found that the Re at 450 nm is decreased and the Re at 650 nm is increased by drawing at very high temperature of 175° C. to 210° C. (Tg of cellulose acylate used is 140° C.).

In the cellulose acylate film after drawing at very high temperature, a peak thought to be derived from crystallization appeared in X-ray diffraction. Thus, it has been speculated that an orientation state of the backbone and the side chain is changed to affect the wavelength dependency of the Re.

That is, to realize the optical compensation film of the present invention, the crystallization is an important factor. An orientation degree of the backbone defined by the following formula (III) calculated by X-ray diffraction measurement is preferably 0.04 to 0.30 and more preferably 0.06 to 0.25.

In the following formula (III), β is an angle made by an incident face of an entering X-ray and one direction in the film face, and I is an diffraction intensity at 2θ=8° in an X-ray diffraction chart measured at an angle of β.

In the following formula (III), $$\cos 2\beta = \int(0,\pi)\cos 2\beta I(\beta) \sin \beta d\beta / \int(0,\pi)\sin \beta d\beta.$$

$$P = (3 \cos 2\beta - 1)/2 \quad \text{Formula (III)}$$

Meanwhile, in order to improve a color shift in the liquid crystal display device, it is also important to control the Rth.

A ratio of the Re to the Rth, $Re_{(450nm)}/Rth_{(450nm)}$ at wavelength 450 nm which is the visible light region is 10 times to 0.95 time, preferably 0.4 time to 0.8 time and more preferably 0.5 time to 0.7 time higher than $Re_{(550nm)}/Rth_{(550nm)}$ at wavelength 550 nm. The $Re_{(650nm)}/Rth_{(650nm)}$ at wavelength 650 nm is 1.01 times to 1.9 times, preferably 1.1 times to 1.7 times and more preferably 1.3 times to 1.6 times higher than $Re_{(550nm)}/Rth_{(550nm)}$ at wavelength 550 nm.

The Re/Rth at R, G or B is preferably in the range of 0.1 to 0.8.

The retardation (Rth) in the thickness direction of the entire optical compensation film has the function to cancel the retardation of a liquid crystal layer in the thickness direction when black is displayed. Thus, the preferable range thereof varies depending on the aspect of each liquid crystal layer.

For example, when used for the optical compensation of the liquid crystal cell with the OCB mode (e.g., liquid crystal cell with the OCB mode having the liquid crystal layer where a product Δn×d of the thickness d (μm) and a refractive index anisotropy Δn is 0.2 μm to 1.5 μm), 70 nm to 400 nm is preferable, 100 nm to 400 nm is more preferable and 130 nm to 200 nm is still more preferable.

As the method of controlling this Rth, the method of applying the liquid crystal layer described later, or the method of using an additive is preferably used.

When cellulose acetate is used for the support, it is preferable to contain a retardation enhancer in the film, and a preferable compound example and the method for production thereof are described in JP-A No. 2000-154261 and JP-A No. 2000-111914.

Optically Anisotropic Layer

The optical compensation film of the present invention has at least one layer of the optically anisotropic layer formed from a liquid crystal compound. The optically anisotropic layer may be formed directly on the surface of the support, or an orientation film may be formed on the support and the optically anisotropic layer may be formed on the orientation film. It is also possible to make the optical compensation film of the present invention by transferring a liquid crystal compound layer formed on another substrate onto the support using an adhesive.

The liquid crystal compound used for the formation of the optically anisotropic layer includes rod-like liquid crystal compounds and discotic liquid crystal compounds. The rod-like liquid crystal compounds and the discotic liquid crystal compounds may be high molecular liquid crystals and low molecular liquid crystals, and further include those exhibiting no crystallinity because the low molecular liquid crystals have been crosslinked.

Rod-Like Liquid Crystal Compound

Examples of the rod-like liquid crystal compounds adapted to the present invention include azomethines, azoxys, cyanobiphenyls, cyanophenyl esters, benzoate esters, cyclohexane carboxylic acid phenyl esters, cyanophenyl cyclohexanes, cyano substituted phenyl pyridines, alkoxy substituted phenyl pyridines, phenyl dioxanes, tolans and alkenylcyclohexylbenzonitriles are preferably used.

The rod-like liquid crystal compounds also include metal complexes. A liquid crystal polymer containing the rod-like liquid crystal in repeat units can be used. In other words, the rod-like liquid crystal compound may be bound to the (liquid crystal) polymer.

The rod-like liquid crystal compounds are described in Quarterly Published Chemical Review Vol. 22 "Chemistry of Liquid Crystal (1994) edited by the Chemical Society of Japan" Sections 4, 7 and 11 and Liquid Crystal Handbook edited by Japan Society for Promotion of Science the 142nd Committee, Section 3.

The birefringence index of the rod-like liquid crystal compound used for the present invention is preferably in the range of 0.001 to 0.7.

It is preferable that the rod-like liquid crystal compound has a polymerizable group in order to fix its orientation state. The polymerizable group is preferably an unsaturated polymerizable group or an epoxy group, more preferably the unsaturated polymerizable group and particularly preferably an ethylenically unsaturated polymerizable group.

Discotic Liquid Crystal Compound

The discotic liquid crystal compound includes benzene derivatives described in C. Destrade et al. research report, Mol. Cryst., 71:111, 1981; torxene derivatives described in C. Destrade et al. research reports, Mol. Cryst., 122:141, 1985 and Physics Lett., A, 78:82, 1990; cyclohexane derivatives described in B. Kohne et al. research report, Angew. Chem., 96:70, 1984; azacrown based and phenyl acetylene based macrocycles described in J. M. Lehn et al. research report, J. Chem. Commun., 1794, 1985 and J. Zhang et al. research report, J. Am. Chem. Soc., 116:2655, 1994.

The discotic liquid crystal compound also includes the compounds exhibiting the crystallinity and having the structure in which a linear alkyl group, alkoxy group or substituted benzoyloxy group has been radially substituted as a side chain of a core for the core of a molecular center. It is preferable to the compound in which a molecule or a molecular assembly has a rotational symmetry and which can impart a certain orientation.

When the optically anisotropic layer is formed from the discotic liquid crystal compound, the compound finally included in the optically anisotropic layer is not necessary to exhibit the crystallinity any more.

For example, when the low molecular discotic liquid crystal compound has a group reactive with heat or light, and the optically anisotropic layer is formed by reacting the group with the heat or the light to polymerize or crosslink resulting in having a high molecular weight, the compound included in the optically anisotropic layer may lose the crystallinity.

Preferable examples are described in JP-A No. 08-50206. The polymerization of the discotic liquid crystal compound is described in JP-A No. 08-27284.

To fix the discotic liquid crystal compound by the polymerization, it is necessary to bind the polymerizable group as a substituent to a discotic core of the discotic liquid crystal compound. However, when the polymerizable group is directly bound to the discotic core, it becomes difficult to keep the orientation state in a polymerization reaction. Thus, a linking group is introduced between the discotic core and the polymerizable group.

Therefore, the discotic liquid crystal compound having the polymerizable group is preferably the compound represented by General Formula (1) below.

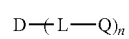

General Formula (1)

In General Formula (1) shown, D represents a discotic core, L represents a bivalent linking group, Q represents a polymerizable group, and n is an integer of 4 to 12.

Examples of the discotic core (D), (D1) to (D15) will be shown below. The following examples, LQ (or QL) means the combination of the bivalent linking group (L) and the polymerizable group (Q).

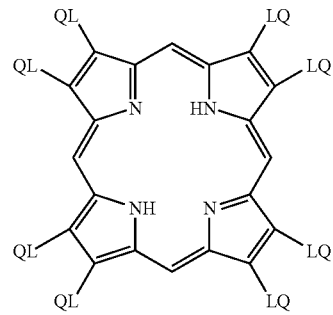

(D1)

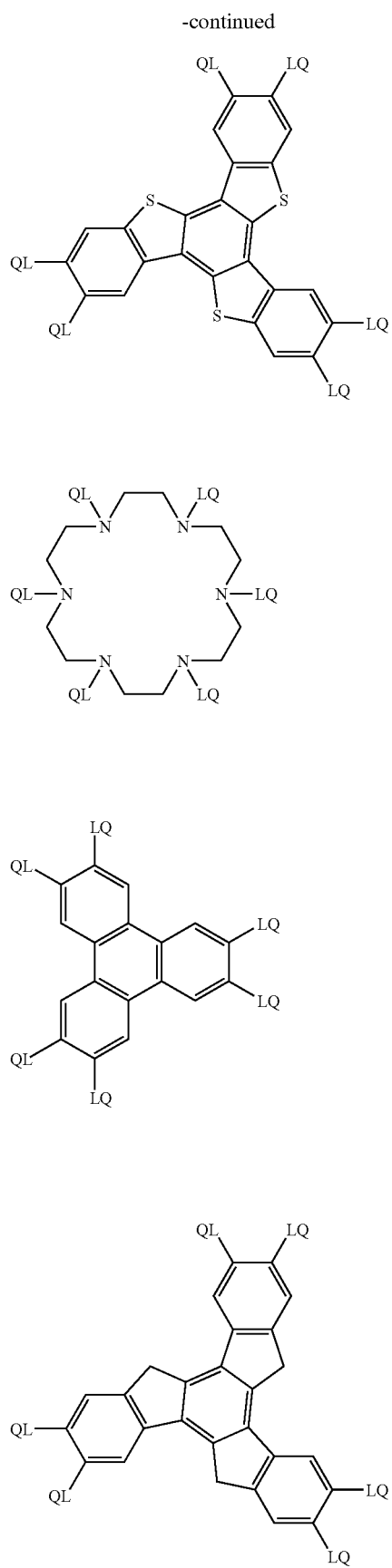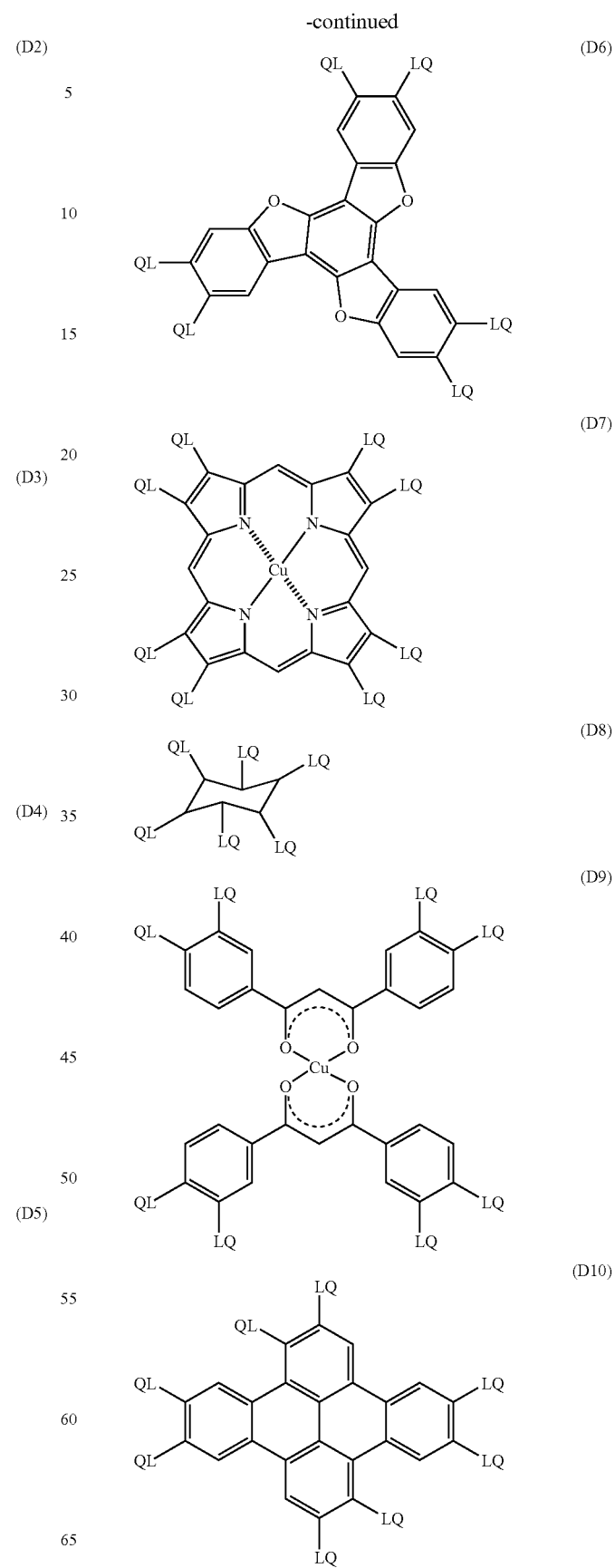

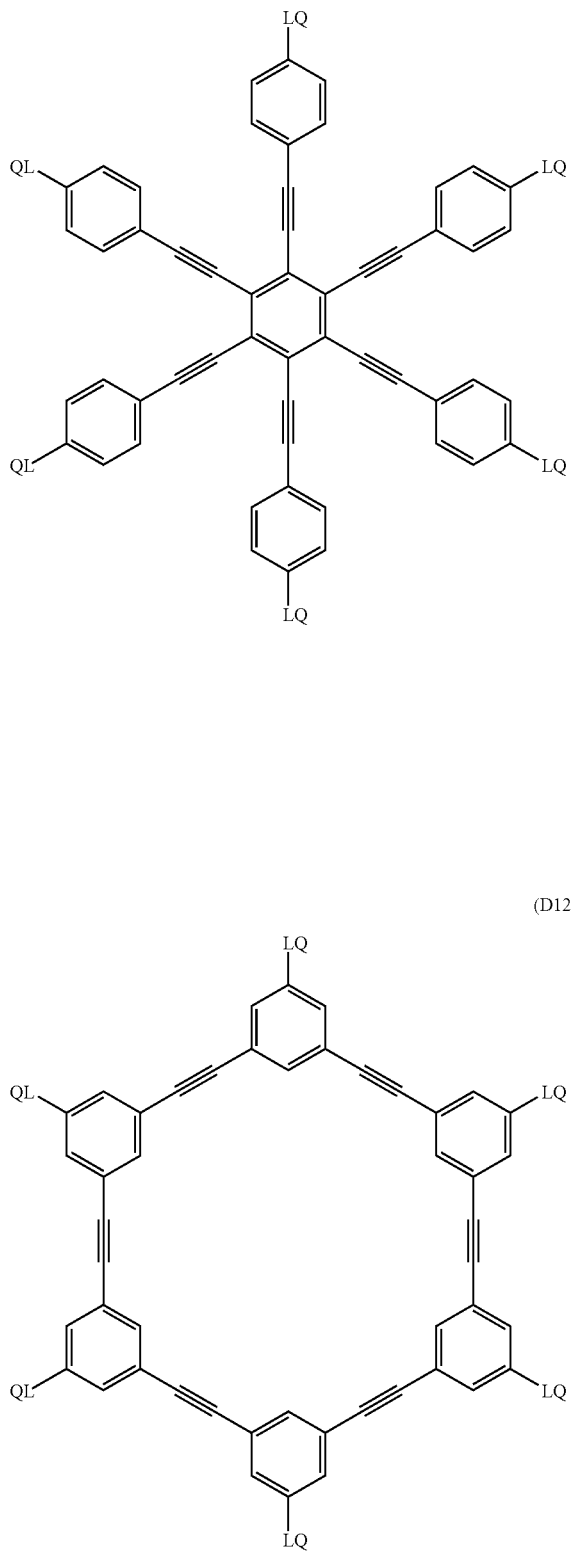

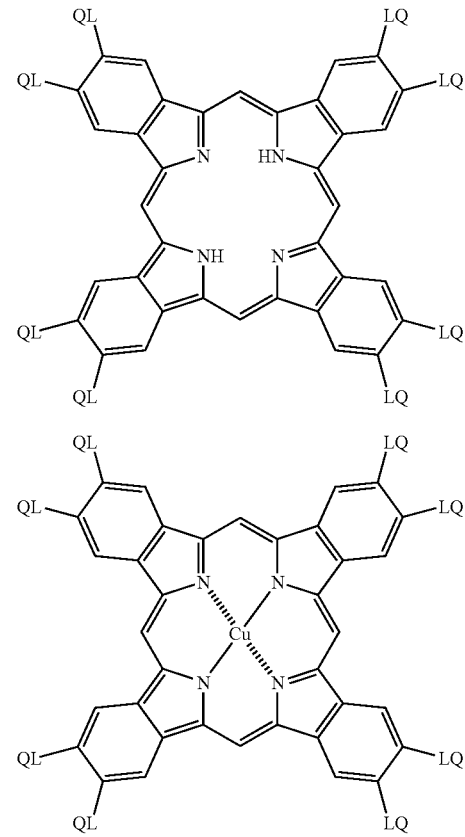

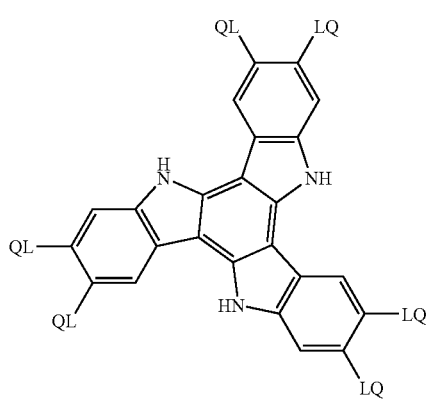

In General Formula (1) shown above, the bivalent linking group (L) is preferably the bivalent linking group selected from the group consisting of alkylene, alkenylene, arylene, —CO—, —HN—, —O—, —S— and combinations thereof.

It is more preferable that the bivalent linking group is one obtained by combining at least two of bivalent groups selected from the group consisting of alkylene, arylene, —CO—, —NH—, —O— and —S—.

It is particularly preferable that the bivalent linking group is one obtained by combining at least two of bivalent groups selected from the group consisting of alkylene, arylene, —CO— and —O—.

The alkylene group preferably has 1 to 12 carbon atoms. The alkenylene group preferably has 2 to 12 carbon atoms. The arylene group preferably has 6 to 10 carbon atoms.

Examples of the bivalent linking group (L1 to L24) are shown below. A left side is bound to the discotic core (D) and a right side is bound to the polymerizable group (Q). AL and AR mean the alkylene or alkenylene group and the arylene group, respectively. The alkylene, alkenylene and arylene groups may have a substituent(s) (e.g., alkyl)

L1: -AL-CO—O-AL-
L2: -AL-CO—O-AL-O—
L3: -AL-CO—O-AL-O-AL-
L4: -AL-CO—O-AL-O—CO—
L5: —CO-AR-O-AL-
L6: —CO-AR-O-AL-O—
L7: —CO-AR-O-AL-O—CO—
L8: —CO—NH-AL-
L9: —NH-AL-O—
L10: —NH-AL-O—CO—
L11: —O-AL-
L12: —O-AL-O—
L13: —O-AL-O—CO—
L14: —O-AL-O—CO—NH-AL-
L15: —O-AL-S-AL-
L16: —O—CO-AR-O-AL-CO—
L17: —O—CO-AR-O-AL-O—CO—
L18: —O—CO-AR-O-AL-O-AL-O—CO—
L19: —O—CO-AR-O-AL-O-AL-O-AL-O—CO—
L20: —S-AL-
L21: —S-AL-O—
L22: —S-AL-O—CO—
L23: —S-AL-S-AL-
L24: —S-AR-AL-

The polymerizable group (Q) in General Formula (1) shown above is determined depending on the type of the polymerization reaction. The polymerizable group (Q) is preferably an unsaturated polymerizable group or an epoxy group, more preferably the unsaturated polymerizable group and particularly preferably an ethylenically unsaturated polymerizable group.

In General Formula (I) shown above, n is an integer of 4 to 12. A specific numeral is determined depending on the type of the discotic core. Multiple combinations of L and Q may be different but is preferably the same.

For the orientation of the liquid crystal compound in the optically anisotropic layer, it is preferable that an average direction of molecular symmetry axes is 43° to 47° for the longitudinal direction.

In a hybrid orientation, the angle between the molecular symmetry axis of the liquid crystal compound and the face of the support is increased or decreased in a depth direction of the optically anisotropic layer and along with the increase of a distance from the face of the support.

It is preferable that the angle is increased along with the increase of the distance. Furthermore, the change of the angle may be a continuous increase, a continuous decrease, an intermittent increase, an intermittent decrease, a change including the continuous increase and the continuous decrease, and an intermittent change including the increase and the decrease. The intermittent change includes a region where a tilt angle is not changed in a halfway of the thickness direction.

The angle could be totally increased or decreased even when the region where the angle is not changed is included. Furthermore, it is preferable that the angle is continuously changed.

The average direction of the molecular symmetry axes in the liquid crystal compound can be controlled by generally selecting the liquid crystal compound or the material of the orientation film, or selecting the method for a rubbing treatment.

As preferable embodiments of the present invention, in the case of the optical compensation film where the slow axes of the support and the liquid crystal compound layer are mutually located other than orthogonal or parallel, the slow axis of the liquid crystal compound can be simply controlled by giving the rubbing treatment to the different direction from the slow axis of the support.

A molecular symmetry axis direction of the liquid crystal compound at a surface side (air side) can be controlled by selecting the type of the liquid crystal compound or an additive used together with the liquid crystal compound.

Examples of the additive used together with the liquid crystal compound include plasticizers, surfactants, polymerizable monomers and polymers. The degree of the change of the orientation direction of the molecular symmetry axis can be controlled by selecting the liquid crystal compound and the additive in the same way as the above. In particular, it is preferable to balance the surfactant and surface tension control of the coating solution described above.

It is preferable that the plasticizer, the surfactant and the polymerizable monomer used together with the liquid crystal compound are compatible with the discotic liquid crystal compound, give the change to the tilt angle of the liquid crystal compound or do not inhibit the orientation. As the polymerizable monomer, compounds having vinyl, vinyloxy, acryloyl and methacryloyl groups are preferable.

The amount of the above compound to be added is generally in the range of 1% by mass to 50% by mass and preferably in the range of 5% by mass to 30% by mass based on the liquid crystal compound. When the monomer having 4 or more polymerizable reactive functional groups is mixed and used, it is possible to enhance adhesiveness between the orientation film and the optically anisotropic layer.

When the discotic liquid crystal compound is used as the liquid crystal compound, it is preferable to use the polymer which has the compatibility to some extent with the discotic liquid crystal compound and can give the change of the tilt angle to the discotic liquid crystal compound.

Examples of the polymer include cellulose esters. Preferable examples of cellulose ester include cellulose acetate, cellulose acetate propionate, hydroxypropylcellulose and cellulose acetate butyrate.

In order not to inhibit the orientation of the discotic liquid crystal compound, the additive amount of the above polymer is preferably in the range of 0.1% by mass to 10% by mass, more preferably in the range of 0.1% by mass to 8% by mass and still more preferably in the range of 0.1% by mass to 5% by mass based on the discotic liquid crystal compound.

The discotic nematic liquid crystal phase-solid phase-transition temperature of the discotic liquid crystal compound is preferably 70° C. to 300° C. and more preferably 70° C. to 170° C.

In the present invention, the thickness of the optically anisotropic layer is preferably 0.1 μm to 20 μm, more preferably 0.5 μm to 15 μm and particularly preferably 1 μm to 10 μm.

Orientation Film

It is preferable that the optical compensation film of the present invention has the orientation film between the support and the optically anisotropic layer. In the present invention, it is preferable that the orientation film is a layer composed of a crosslinked polymer. The polymer used for the orientation film may be a polymer itself capable of being crosslinked or a polymer crosslinked by a crosslinker.

The above orientation film can be formed by reacting the polymer having the functional group or the polymer where the functional group has been introduced between the polymers by light, heat or pH change, or by introducing a binding group derived from a crosslinker between the polymers using the crosslinker which is the compound having a high reactive activity to crosslink between the polymers.

The orientation film composed of the crosslinked polymer can be formed by typically applying a coating solution containing the above polymer or a mixture of the polymer and the crosslinker on the support followed by heating.

In order to suppress the occurrence of dusts of the orientation film in a rubbing step described later, it is preferable to increase a crosslinking degree. When a value [1−(Ma/Mb)] obtained by subtracting a ratio (Ma/Mb) of the amount (Ma) of the crosslinker left after crosslinking to the amount (Mb) of the crosslinker added in the coating solution from 1 is defined as the crosslinking degree, the crosslinking degree is preferably 50% to 100%, more preferably 65% to 100% and particularly preferably 75% to 100%.

In the present invention, as the polymer used for the orientation film, it is possible to use any of the polymer itself capable of being crosslinked and the polymer crosslinked by the crosslinker. The polymer having both functions can also be used.

Examples of the above polymer include polymers such as polymethyl methacrylate, acrylic acid/methacrylic acid copolymers, styrene/maleinimide copolymers, polyvinyl alcohol, and modified polyvinyl alcohol, poly(N-methylolacrylamide), styrene/vinyl toluene copolymers, chlorosulfonated polyethylene, nitrocellulose, polyvinyl chloride, chlorinated polyolefin, polyester, vinyl acetate/vinyl chloride copolymers, ethylene/vinyl acetate copolymers, carboxymethylcellulose, polyethylene, polypropylene and polycarbonate, and compounds such as silane coupling agents.

Examples of the preferable polymer are water soluble polymers such as poly(N-methylolacrylamide), carboxymethylcellulose, gelatin, polyvinyl alcohol, and modified polyvinyl alcohol. Furthermore, gelatin, polyvinyl alcohol, and modified polyvinyl alcohol are preferable. In particular, polyvinyl alcohol and modified polyvinyl alcohol can be included.

Among the above polymers, polyvinyl alcohol and modified polyvinyl alcohol are preferable. In polyvinyl alcohol, a saponification degree is, for example, 70% to 100%, typically 80% to 100% and more preferably 85% to 95%.

A polymerization degree is preferably in the range of 100 to 3000. Modified polyvinyl alcohols include those modified with copolymerization (as a modifying group, for example, COONa, $Si(OX)_3$, $N(CH_3)_3Cl$, $C_9H_{19}COO$, $SO_3$, Na or $C_{12}H_{25}$ is introduced), those modified with chain transfer (as the modifying group, for example, COONa, SH or $C_{12}H_{25}$ is introduced) and those modified with block polymerization (as the modifying group, for example, COOH, $CONH_2$, COOR or $C_6H_5$ is introduced).

The polymerization degree is preferably in the range of 100 to 3000. Among them, unmodified or modified polyvinyl alcohol having the saponification degree of 80% to 100% is preferable, and unmodified polyvinyl alcohol or alkylthio modified polyvinyl alcohol having a saponification degree of 85% to 95% is more preferable.

As modified polyvinyl alcohol used for the orientation film, a reaction product of the compound represented by General Formula (2) below and polyvinyl alcohol is preferable. In General Formula (2) below, $R^1$ represents an unsubstituted alkyl group or an alkyl group substituted with an acryloyl group, a methacryloyl group or an epoxy group; W represents a halogen atom, an alkyl group or an alkoxy group; X represents an atomic group required for forming active ester, acid anhydrate or acid halide; l represents 0 or 1; and n represents an integer of 0 to 4.

General Formula (2)

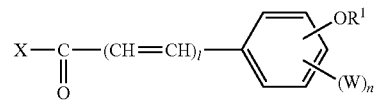

As for modified polyvinyl alcohol used for the orientation film, a reaction product of the compound represented by General Formula (3) below and polyvinyl alcohol is also preferable. In General Formula (3) below, $X^1$ represents an atomic group required for forming active ester, acid anhydrate or acid halide; and m represents an integer of 2 to 24.

General Formula (3)

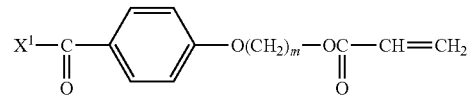

Polyvinyl alcohol used for reacting with the compounds represented by General Formulas (2) and (3) is exemplified by the unmodified polyvinyl alcohol, and the modified polyvinyl alcohol, e.g., those modified with copolymerization, i.e. those modified with chain transfer and those modified with block polymerization.

Preferable examples of the particular modified polyvinyl alcohol are described in detail in JP-A No. 08-338913.

When a hydrophilic polymer such as polyvinyl alcohol is used for the orientation film, it is preferable in terms of hard film degree to control a percentage of moisture content, and the controlled percentage of moisture content is preferably 0.4% to 2.5% and more preferably 0.6% to 1.6%. The percentage of moisture content can be measured by a commercially available water content measurement device of Karl Fischer's method. The orientation film preferably has a film thickness of 10 μm or less.

Method of Producing Optical Compensation Film

Subsequently, the method of continuously producing the preferable optical compensation film of the present invention will be described.

Method of Producing Roll-Shaped Optical Compensation Film

In the method of producing the optical compensation film of the present invention, the following steps (1) to (4) are continuously performed.

Step (1): Step of giving the rubbing treatment by a rubbing roller to the surface of a lengthy support fed to the longitudinal direction or the surface of an orientation film formed on the support.

Step (2): Step of applying a coating solution containing a liquid crystal compound onto the surface treated with rubbing.

Step (3): Step of making an optically anisotropic layer by drying the applied coating solution, and simultaneously or after drying, orienting the liquid crystal compound at temperature equal to or higher than a liquid crystal transition temperature to fix the orientation.

Step (4): Step of rolling up a lengthy laminated body in which the optically anisotropic layer has been formed.

Here, a film surface wind speed on the liquid crystal compound surface, which blows to the direction other than the direction to which the rubbing treatment has been given, during orienting the liquid crystal compound at temperature equal to or higher than the liquid crystal transition temperature preferably satisfies the following mathematical formula (3). In the following formula (3), V is preferably 0 to $2.5 \times 10^{-3} \times \eta$. In the following formula (3), V is the film surface wind speed (m/sec) on the surface of the liquid crystal compound, and $\eta$ is a viscosity (cp) of a liquid crystal layer at an orientation temperature of the liquid crystal compound.

$$0 < V < 5.0 \times 10^{-3} \times \eta \qquad \text{Formula (3)}$$

According to the method of producing the optical compensation film of the present invention, it is possible to continuously and stably produce the optical compensation film where the average direction of orthogonal projections to the support surface of the molecular symmetry axis of the liquid crystal compound, i.e., the average direction of the molecular symmetry axes of the optically anisotropic layer is different from the in-plane slow axis of the support, i.e., the longitudinal direction of the support, and further the angle between the average direction of the molecular symmetry axes and a rubbing direction is substantially 0°, preferably −2° to 2° and more preferably −1° to 1°. This method is suitable for mass production.

When the optical compensation film of the present invention is applied to the liquid crystal display device with the OCB mode, it is preferable that the optical compensation film and the polarizing plate are attached by roll-to-roll. It is preferable that the angle between the average direction of the molecular symmetry axes and the in-plane slow axis of the support, i.e., the longitudinal direction of the support is substantially 450.

Furthermore, in the method of producing the optical compensation film of the present invention, it is desirable to include at least one of the following requirements (a) to (d). Details of these steps are described in JP-A No. 09-73081.

(a) In the above step (2), a polymerizable liquid crystal compound having a crosslinking functional group is used as the liquid crystal compound, in the above step (3), the orientation is fixed by continuously irradiating the coating layer with light to cure the polymerizable liquid crystal compound by polymerization, and then the above step (4) is continuously performed.

(b) In the above step (1), the rubbing treatment is given by the rubbing roller as dusts are removed from the surface of the support or the orientation film.

(c) Before the above step (2), a step of removing the dust from the surface of the support or the orientation film to which the rubbing treatment has been given is performed.

(d) Before the above step (4), a step of examining an optical property of the formed optically anisotropic layer by continuously measuring.

Here, details of the above steps (1) to (4) will be described.

Step (1)

In the step (1), the rubbing treatment is given by the rubbing roller to the surface of the lengthy support fed to the longitudinal direction or the surface of the orientation film formed on the support.

A diameter of the rubbing roller used in the step (1) is preferably 100 mm to 500 mm and more preferably 200 mm to 400 mm in terms of handling suitability and fabric lifetime.

A width of the rubbing roller is necessary to be wider than a width of the film to be fed, and is preferably a film width× $2^{1/2}$ or more.

A rotation frequency of the rubbing roller is preferably to be set low in terms of producing the dusts, depends on the orientation of the liquid crystal compound, and is preferably 100 rpm to 1000 rpm, more preferably 250 rpm to 850 rpm.

To keep the orientation of the liquid crystal compound even when the rotation frequency is made low, it is preferable to heat the support or the orientation film upon rubbing. The heating temperature is preferably (Tg of material −50° C.) to (Tg of material +50° C.) on the film surface of the support or the orientation film. When the orientation film composed of polyvinyl alcohol is used, it is preferable to control an environmental humidity of rubbing, which is preferably 25% to 70% RH, more preferably 30% to 60% RH and particularly preferably 35% to 55% RH as a relative humidity at 25° C.

A feeding speed of the support is preferably 10 m/minute to 100 m/minute and more preferably 15 m/minute to 80 m/minute in terms of productivity and in terms of orientation of the liquid crystal compound. Feeding can be performed using various apparatuses conventionally used for the feeding of films, and a feeding system is not particularly limited.

The orientation film can be made by applying the coating solution in which the material such as polyvinyl alcohol described above has been dissolved into water and/or an organic solvent onto the surface of the support, and drying. The orientation film can be made before the above series of steps, and the orientation film may be continuously made on the surface of the fed lengthy support.

Step (2)

In the step (2), the coating solution containing the liquid crystal compound is applied onto the surface treated with rubbing. As the solvent used for preparing the coating solution for the optically anisotropic layer, the organic solvent is suitably used.

Examples of the organic solvent include amide (e.g., N,N-dimethylformamide), sulfoxide (e.g., dimethylsulfoxide), heterocyclic compounds (e.g., pyridine), hydrocarbon (e.g., benzene, hexane), alkyl halide (e.g., chloroform, dichloromethane, tetrachloroethane), ester (e.g., methyl acetate, butyl acetate), ketone (e.g., acetone, methyl ethyl ketone) and ether (e.g., tetrahydrofuran, 1,2-dimethoxyethane). Alkyl halide and ketone are preferable. Two or more organic solvents may be combined.

In order to produce the optically anisotropic layer having a high uniformity, the surface tension of the coating solution is preferably 25 mN/m or less and more preferably 22 mN/m or less.

In order to attain the surface tension in the range, it is preferable that the surfactant or a fluorine compound, particularly a fluorine based polymer such as a fluoro fatty acid containing copolymer comprising a repeat unit corresponding to a monomer of the following (i) and a repeat unit corresponding to a monomer of the following (ii) is contained in the coating solution which forms the optically anisotropic layer.

(i) Fluoro fatty acid containing monomer represented by General Formula (4) below (ii) Poly(oxyalkylene)acrylate and/or poly(oxyalkylene) methacrylate

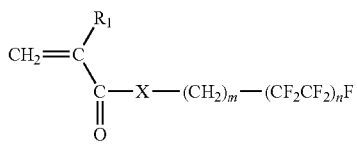

General Formula (4)

In General Formula (4), $R^1$ represents a hydrogen atom or a methyl group; X represents an oxygen atom, a sulfur atom or —$N(R^2)$—; m represents an integer of 1 to 6; and n represents an integer of 2 to 4. $R^2$ represents a hydrogen atom or an alkyl group having 1 to 4 carbon atoms.

A weight average molecular weight of the fluorine based polymer added in the coating solution for the optically anisotropic layer is preferably 3000 to 100,000 and more preferably 6000 to 80,000.

An amount of the fluorine based polymer to be added is preferably 0.005% by mass to 8% by mass, more preferably 0.01% by mass to 1% by mass and still more preferably 0.05% by mass to 0.5% by mass based on an application composition (application component excluding the solvent) mainly containing the liquid crystal compound.

When the additive amount of the fluorine based polymer is less than 0.005% by mass, the effect is insufficient. When it exceeds 8% by mass, a coating film is not sufficiently dried, and performances (e.g., evenness of retardation) of the optical compensation film is harmfully affected.

The application of the coating solution onto the surface treated with rubbing can be carried out by methods known publicly (e.g., a wire bar coating method, an extruding coating method, a direct gravure coating method, a reverse gravure coating method, a die coating method). The amount to be applied can be appropriately determined based on the desired thickness of the optically anisotropic layer.

Step (3)

In the above step (3), the optically anisotropic layer is made by drying the applied coating solution, and simultaneously or after drying, orienting the liquid crystal compound at temperature equal to or higher than the liquid crystal transition temperature, and fixing its orientation. The liquid crystal composition has the desired orientation by heating upon drying or by heating after drying.

A drying temperature can be determined in consideration of a boiling point of the solvent used for the coating solution and the materials of the support and the orientation film. An orientation temperature of the liquid crystal compound can be determined depending on a liquid crystal phase-solid phase transition temperature of the liquid crystal compound to be used.

When the discotic liquid crystal compound is used as the liquid crystal compound, the orientation temperature is preferably 70° C. to 300° C. and more preferably 70° C. to 170° C.

The viscosity of a liquid crystal state is preferably 10 cp to 10,000 cp and more preferably 100 cp to 1,000 cp.

When the viscosity is too low, the influence of the wind is easily given upon orientation, and the wind speed/wind direction control with very high accuracy is required for continuous production. Meanwhile, when the viscosity is high, the influence of the wind is hardly given, but the orientation of the liquid crystal becomes slow and the productivity is extremely deteriorated.

The viscosity of the liquid crystal layer can be appropriately controlled by a molecular structure of the liquid crystal compound. The method of adjusting to the desired viscosity by using the additive (particularly, cellulose based polymers) described above and a gelling agent in an appropriate amount is preferably used.

Heating can be carried out by sending the hot wind at a given temperature or feeding in a heated room kept at the given temperature.

For the hot wind at that time, it is preferable to control the wind speed in the directions other than the rubbing direction for the liquid crystal compound as shown in the following formula (3). In the following formula (3), V is the film surface wind speed (m/sec) on the surface of the liquid crystal compound, and η is the viscosity (cp) of the liquid crystal layer at the orientation temperature of the liquid crystal compound.

$$0 < V < 5.0 \times 10^{-3} \times \eta$$  Formula (3)

The optically anisotropic layer is formed by further fixing the oriented liquid crystal compound with keeping the orientation state.

The liquid crystal compound can be fixed by cooling to a solid phase transition temperature or a polymerization reaction, and it is preferable to fix by the polymerization reaction. The polymerization reaction includes a thermal polymerization reaction using a thermal polymerization initiator and a photopolymerization reaction using a photopolymerization initiator. The photopolymerization is preferable.

Examples of the photopolymerization initiator include α-carbonyl compounds (described in U.S. Pat. Nos. 2,367,661 and 2,367,670), acyloin ether (described in U.S. Pat. No. 2,448,828), α-hydrocarbon substituted aromatic acyloin compounds (described in U.S. Pat. No. 2,722,512), multinuclear quinone compounds (described in U.S. Pat. Nos. 3,046,127 and 2,951,758), combinations of triaryl imidazole dimer and p-amino phenyl ketone (described in U.S. Pat. No. 3,549,367), acridine and phenazine compounds (described in JP-A No. 60-105667 and U.S. Pat. No. 4,239,850) and oxadiazole (described in U.S. Pat. No. 4,214,970).

The amount of the photopolymerization initiator to be used is preferably in the range of 0.01% by mass to 20% by mass and more preferably in the range of 0.5% by mass to 5% by mass based on the solid content of the coating solution.

It is preferable to use ultraviolet ray for light irradiation for advancing the polymerization of the liquid crystal compound and fixing the liquid crystal compound. An irradiation energy is preferably in the range of 20 $J/cm^2$ to 50 $J/cm^2$, more preferably in the range of 20 $mJ/cm^2$ to 5000 $mJ/cm^2$ and still more preferably in the range of 100 $mJ/cm^2$ to 800 $mJ/cm^2$.

In order to facilitate the photopolymerization reaction, the light may be irradiated under a heating condition. The light irradiation can be carried out by passing the support on which the coating solution for the optically anisotropic layer has been applied through a feeding path where one or more light sources have been disposed at positions up or down or right or left of the path.

Before transferring to the above step (4), a protection layer can also be provided on the optically anisotropic layer made in the step (3). For example, the film for the protection layer previously made may be continuously laminated on the surface of the optically anisotropic layer made in a lengthy shape.

In the above step (4), the lengthy laminated body where the optically anisotropic layer has been formed is rolled up. Rolling up may be performed by winding the support having the optically anisotropic layer fed continuously to a cylindrical core.

The optical compensation film obtained by the step (4) is a rolled form. Thus, its handling is easy even when it is produced on a large scale. The rolled form can be directly stored and fed.

For details of various conditions of respective steps and usable apparatuses in the production method of the present invention, the various conditions and the apparatuses described in JP-A No. 09-73081 can be applied.

Polarizing Plate

The polarizing plate of the present invention is composed of a polarizing film and a pair of optical compensation films which sandwich the polarizing film, and it is preferable in terms of polarization performance and transmittance to be composed in such a way. For example, after cutting into the desired rectangular shape, the aforementioned optical compensation film and polarizing film may be attached, or after attaching with the lengthy polarizing film, it is also possible to cut into the desired shape.

The polarizing plate of the present invention has not only a polarization function but also an optical compensation function, and can be easily incorporated in the liquid crystal display device. The aspect in which the optical compensation film is made the protection film of the polarizing film contributes to making the liquid crystal display device thin.

Polarizing Film

The polarizing film used for the polarizing plate of the present invention is preferably an application type polarizing film typified by Optiva Inc., or a polarizing film composed of a binder and iodine or dichroic dye.

The iodine and the dichroic dye exert a polarization performance by orienting in the binder. It is preferable that iodine and the dichroic dye orient along a binder molecule or the dichroic dye orients in one direction by self-assembly as the liquid crystal.

The currently commercially available polarizing film is generally made by immersing the drawn polymer in a solution of iodine or the dichroic dye in a bath and infiltrating iodine or the dichroic dye in the binder.

In the commercially available polarizing film, iodine or the dichroic dye is distributed in about 4 µm from the polymer surface (sum of both sides is about 8 µm), and to obtain the sufficient polarization performance, the thickness of at least 10 µm is necessary. An infiltration degree can be controlled by a solution concentration of iodine or the dichroic dye, the temperature in the bath and an immersing time period.

Therefore, a lower limit of the binder thickness is preferably 10 µm as the above. An upper limit of the thickness is the thinner, the better in terms of light leakage phenomenon which occurs when the polarizing plate is used for the liquid crystal display device. The thickness is preferably equal to or thinner than that (about 30 µm) of the currently commercially available polarizing plate, preferably 25 µm or less and more preferably 20 µm or less. When the thickness is 20 µm or less, no light leakage phenomenon is observed in the liquid crystal display device of 17 inches.

The binder in the polarizing film may be crosslinked. As the binder in the polarizing film, the polymer itself capable of being crosslinked may be used. The polarizing film can be formed by giving the light, the heat or the pH change to the polymer having the functional group or the polymer obtained by introducing the functional group to the polymer to react the functional group to crosslink between the polymers.

A crosslinking structure may be introduced into the polymer by a crosslinker. The polarizing film can be formed by introducing the binding group derived from the crosslinker between the binders using the crosslinker which is the compound having the high reactive activity to crosslink between the binders.

Crosslinking can be generally carried out by applying a coating solution comprising the polymer capable of being crosslinked or the mixture of the polymer and the crosslinker onto the transparent support followed by heating. Since the durability could be assured at the stage of a final product, the crosslinking treatment may be performed at any stage during obtaining the final polarizing plate.

As described above, as the binder in the polarizing film, any of the polymer itself capable of being crosslinked or the polymer crosslinked by the crosslinker can be used.

Examples of the polymer include polymethyl methacrylate, polyacrylic acid, polymethacrylic acid, polystyrene, polyvinyl alcohol, modified polyvinyl alcohol, poly(N-methylolacrylamide), polyvinyl toluene, chlorosulfonated polyethylene, nitrocellulose, chlorinated polyolefin (e.g., polyvinyl chloride), polyester, polyimide, polyvinyl acetate, polyethylene, carboxymethylcellulose, polypropylene, polycarbonate, and copolymers thereof (e.g., acrylic acid/methacrylic acid copolymers, styrene/maleinimide copolymers, styrene/vinyl toluene copolymers, vinyl acetate/vinyl chloride copolymers, ethylene/vinyl acetate copolymers). The silane coupling agent may be used as the polymer.

The water soluble polymers (e.g., poly(N-methylolacrylamide), carboxymethylcellulose, gelatin, polyvinyl alcohol, and modified polyvinyl alcohol) are preferable, gelatin, polyvinyl alcohol and modified polyvinyl alcohol are more preferable, and polyvinyl alcohol and modified polyvinyl alcohol are particularly preferable.

The saponification degree of polyvinyl alcohol and modified polyvinyl alcohol is preferably 70% to 100%, more preferably 80% to 100% and particularly preferably 95% to 100%. The polymerization degree of polyvinyl alcohol is preferably 100 to 5000.

Modified polyvinyl alcohol is obtained by introducing a modifying group into polyvinyl alcohol by copolymerization modification, chain transfer modification or block polymerization modification. In the copolymerization modification, as the modifying group, COONa, $Si(OH)_3$, $N(CH_3)_3Cl$, $C_9H_{19}COO$, $SO_3Na$ and $C_{12}H_{25}$ can be introduced. In the chain transfer modification, as the modifying group, COONa, SH and $SC_{12}H_{25}$ can be introduced.

The polymerization degree of modified polyvinyl alcohol is preferably 100 to 3,000. Modified polyvinyl alcohol is described in JP-A No. 08-338913, JP-A No. 09-152509 and JP-A No. 09-316127.

Unmodified polyvinyl alcohol having the saponification degree of 85% to 95%, and alkylthio modified polyvinyl alcohol are particularly preferable. Furthermore, two or more polyvinyl alcohols and modified polyvinyl alcohols may be combined.

The crosslinker is described in U.S. Reissue Pat. No. 23297, and can be used for the present invention. Boron compounds (e.g., boric acid, borax) can also be used as the crosslinker.

If the crosslinker of the binder is added in a large amount, humidity heat resistance of the polarizing plate can be enhanced. But, if the crosslinker is added at 50% by mass or more based on the binder, the orientation of iodine or the dichroic dye is reduced. The amount of the crosslinker to be added is preferably 0.1% by mass to 20% by mass and more preferably 0.5% by mass to 15% by mass based on the binder.

The binder contains the unreacted crosslinker to some extent after completing the crosslinking reaction. But, the amount of the remaining crosslinker is preferably 0.1% by mass or less and more preferably 0.5% by mass or less in the binder.

When the crosslinker in the amount more than 1.0% by mass is contained in the binder, a trouble sometimes occurs in durability. That is, when the polarizing film containing a large amount of the remaining crosslinker is incorporated in the liquid crystal display device, used for a long time or left stand under an atmosphere of high temperature and high humidity for a long time, a polarization degree is sometimes reduced.

As the dichroic dye, azo based dyes, stilbene based dyes, pyrazolone based dyes, triphenylmethane based dyes, quinoline based dyes, oxazine based dyes, thiazine based dyes or anthraquinone based dyes are used. The dichroic dye is preferably water soluble. It is preferable that the dichroic dye has a hydrophilic substituent (e.g., sulfo, amino, hydroxyl).

Examples of the dichroic dye include C.I. direct yellow 12, C.I. direct orange 39, C.I. direct orange 72, C.I. direct red 39, C.I. direct red 79, C.I. direct red 81, C.I. direct red 83, C.I. direct red 89, C.I. direct violet 48, C.I. direct blue 67, C.I. direct blue 90, C.I. direct green 59 and C.I. acid red 37.

The dichroic dyes are described in JP-A No. 01-161202, JP-A No. 01-172906, JP-A No. 01-172907, JP-A No. 01-183602, JP-A No. 01-248105, JP-A No. 01-265205 and JP-A No. 07-261024.

The dichroic dyes are used as free acids, or salts such as alkali metal salts, ammonium salts, or amine salts. The polarizing film having various hues can be produced by combining two or more dichroic dyes. The polarizing film using the compound (dye) exhibiting a black color when the polarization axes are orthogonalized, or the polarizing film or the polarizing plate combining various dichroic dyes to exhibit the black color is excellent in single plate transmittance and polarization rate, which is preferable.

Method of Producing Polarizing Film

It is preferable that the polarizing film is stained with iodine or the dichroic dye after drawing the binder in the longitudinal direction (MD direction) of the polarizing film.

In a drawing method, a drawing scale is preferably 2.5 times to 30.0 times and more preferably 3.0 times to 10.0 times. The drawing can be carried out by dry drawing in air.

Wet drawing in the state of immersing in water may be carried out. The drawing scale in the dry drawing is preferably 2.5 times to 5.0 times, and the drawing scale in the wet drawing is preferably 3.0 times to 10.0 times.

A drawing step may be performed by dividing into several times. By dividing into the several times, even in the drawing at high scale, it is possible to draw more evenly.

Before drawing, some horizontal or vertical drawing (extent that shrinkage in a width direction is prevent) may be performed. The drawing can be carried out by performing tenter drawing in biaxial drawing in different steps between right and left. The biaxial drawing method is the same as the drawing method performed in ordinary production of the films.

It is preferable to dispose the protection film at both sides of the polarizing film, and it is preferable to use a part of the roll-shaped optical compensation film of the present invention as the protection film at one side.

For example, the laminated body obtained by laminating the protection film/the polarizing film/the support/the optically anisotropic layer/the protection film/the polarizing film/the support/the orientation film/the optically anisotropic layer in this order is preferable.

But, the constitution is not limited thereto, and the polarizing film and the surface side of the optically anisotropic layer may be attached. An adhesive may be used for attachment. For example, polyvinyl alcohol based resins (including polyvinyl alcohol modified with acetoacetyl, sulfonate, carboxyl or oxyalkylene) and an aqueous solution of the boron compound can be used as the adhesive. Among them, the polyvinyl alcohol based resin is preferable.

The thickness of the adhesive after drying is preferably in the range of 0.01 µm to 10 µm and particularly preferably in the range of 0.05 µm to 5 µm.

When the polarizing plate of the present invention is used for the liquid crystal display device, it is preferable to install a reflection protection layer on the surface at a visible side, and the reflection prevention layer may be doubled with the protection layer at the visible side of the polarizing film.

It is preferable in terms of suppression of color change due to the visible angle in the liquid crystal display device to make an internal haze of the reflection prevention layer 50% or more. Preferable specific examples of them are described in JP-A No. 2001-33783, JP-A No. 2001-343646 and JP-A No. 2002-328228.

To increase a contrast ratio in the liquid crystal display device, the higher the transmittance of a polarizer (polarizing film) is, the more preferable, and the higher the polarization degree is, the more preferable.

The transmittance of the polarizer of the present invention at a wavelength of 550 nm is preferably in the range of 30% to 50%, more preferably in the range of 35% to 50% and particularly preferably in the range of 40% to 50%.

The polarization degree at the light of wavelength 550 nm is preferably in the range of 90% to 100%, more preferably in the range of 95% to 100% and particularly preferably in the range of 99% to 100%.

Liquid Crystal Display Device

The optical compensation film or the polarizing plate using the optical compensation film of the present invention is advantageously used for the liquid crystal display device with the birefringence mode, particularly the liquid crystal display device with the OCB mode, the liquid crystal display device with the HAN mode and the ECB type reflection type liquid crystal display device which are difficult to display black/white unless the optical compensation film is loaded.

A transmittance type of the liquid crystal display device is composed of a liquid crystal cell and two polarizing plates disposed at both sides thereof. The liquid crystal cell bears the liquid crystal between two electrode substrates.

One optical compensation film is disposed between the liquid crystal cell and one polarizing plate, or two are disposed between the liquid crystal cell and both polarizing plates.

The liquid crystal cell with the OCB mode is the liquid crystal cell with a bend alignment mode which orients the rod-like liquid crystal compound in a substantially reverse direction (symmetrically) in an upper part and a lower part of the liquid crystal cell, and the liquid crystal display device using the same is disclosed in U.S. Pat. Nos. 4,583,825 and 5,410,422. Since the rod-like liquid crystal compound orients symmetrically in the upper part and the lower part of the liquid crystal cell, the liquid crystal cell with the bend alignment mode has a self optical compensation function.

Thus, this liquid crystal mode is also referred to as the OCB (optically compensatory bend) mode. The liquid crystal display device with the bend alignment mode has an advantage that the response speed is fast.

It is preferred in the OCB mode that the product $\Delta n \times d$ of the thickness "d" of the liquid crystal layer and the refractive index anisotropy $\Delta n$ of the liquid crystal is 500 nm to 800 nm in order to produce display devices with excellent displaying properties for static images and higher response speed.

It is also preferable to combine the OCB mode with a field sequential driving mode because the OCB mode can perform a high speed responding drive.

In the liquid crystal cell with the HAN mode, rod-like liquid crystal molecules like the halved liquid crystal cell with the OCB mode exhibit a homeotropic alignment at the upper part of the liquid crystal cell, and exhibit a homogenous alignment at the power part. Totally, the liquid crystal cell with the HAN mode exhibits a hybrid alignment, and is preferably applied to the reflection type liquid crystal display device.

It is preferred in the HAN mode that the product Δn×d of the thickness "d" of the liquid crystal layer and the refractive index anisotropy Δn of the liquid crystal is 250 nm to 400 nm.

The liquid crystal cell with the ECB mode is the liquid crystal cell with a horizontal alignment mode where the rod-like liquid crystal molecules are aligned in substantially the same direction at the upper and lower parts of the liquid crystal cell, and is known from the longest time ago.

EXAMPLES

Examples of the present invention will be described below, but the present invention is not limited to the following Examples at all. In the following descriptions, all percentages and parts are expressed by mass unless indicated otherwise.

Example 1

Production of Optical Compensation Film (KH-1)

Production of Support (PK-1)

A cellulose acetate solution was prepared by placing the following composition in a mixing tank and stirred with heating to dissolve respective components.

| Composition of cellulose acetate solution | |
|---|---|
| Cellulose acetate*[1] | 100 parts |
| Triphenyl phosphate (plasticizer) | 7.8 parts |
| Biphenyldiphenyl phosphate (plasticizer) | 3.9 parts |
| Methylene chloride (first solvent) | 300 parts |
| Methanol (second solvent) | 45 parts |
| Dye 360 FP*[2] | 0.0009 part |

*[1]acetylation degree 60.9%
*[2]by Sumitomo chemical Co.

In another mixing tank, 16 parts by mass of a retardation enhancer shown in General Formula (5) below, 80 parts of methylene chloride and 20 parts of methanol were placed, and stirred with heating to prepare a retardation enhancer solution.

To 464 parts of the cellulose acetate solution of the above composition, 36 parts of the retardation enhancer solution and 1.1 parts of silica fine particles (R972, by Aerosil Co.) were mixed, which was then thoroughly stirred to prepare a dope.

An amount of the added retardation enhancer was 7.5 parts relative to 100 parts of cellulose acetate. The amount of the added silica fine particles was 0.15 parts relative to 100 parts of cellulose acetate.

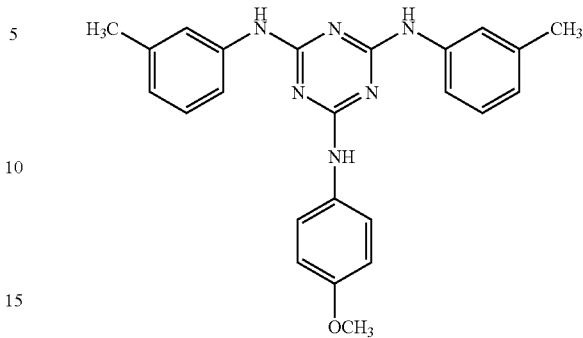

General Formula (5)

The resulting dope was flow-cast using a flow casting machine having a band with a width of 2 m and a length of 65 m. When a temperature on a film surface on the band became 40° C., the film was dried for one minute, and after peeling off, the film was drawn 28% to a width direction in a dry wind at 140° C. using a tenter.

Subsequently, a support (PK-1) containing 0.3% by mass remaining solvent was produced by drying in the dry wind at 135° C. for 20 minutes.

The resulting support (PK-1) had the width of 1,340 mm and a thickness of 38 μm.

When measured at a wavelength of 550 nm using an ellipsometer (M-150, by JASCO Co.), the retardation value (Re) was 39 nm. The retardation value (Rth) at a wavelength of 550 nm was 190 nm.

Likewise, the retardation values (Re) at wavelengths of 450 nm and 650 nm were 40 nm and 38 nm, respectively.

Also, the retardation values (Rth) at wavelengths of 450 nm and 650 nm were 193 nm and 185 nm, respectively. These results are shown Table 1.

Onto the resulting support (PK-1) of band side, 10 mL/m² of 1.0 N potassium hydroxide solution (solvents: water/isopropyl alcohol/propylene glycol=62.9 parts/15 parts/15.8 parts) was applied, kept at about 40° C. for 30 seconds, an alkali solution was scraped, the support was washed with purified water, and water drops were eliminated with an air knife.

Subsequently, the support was dried at 100° C. for 15 seconds. A contact angle of this support (PK-1) against the purified water was 42°.

Production of Orientation Film

On this support (PK-1) (alkali-treated side), 28 mL/m² of an orientation film coating solution of the following composition was applied using No. 16 wire bar coater. An orientation film was made by drying in a hot wind at 60° C. for 60 seconds and further in the hot wind at 90° C. for 150 seconds.

| Composition for Orientation Film Coating Solution | |
|---|---|
| Modified polyvinyl alcohol*[1] | 10 parts |
| Water | 371 parts |
| Methanol | 119 parts |
| Glutaric aldehyde (crosslinker) | 0.5 part |
| Citrate ester AS3*[2] | 0.35 parts by mass |

*[1]expressed General Formula (6) below
*[2]by Sankyo Chemical Industry Co., Ltd.

General Formula (6)

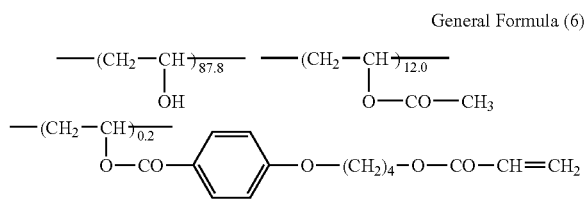

Rubbing Treatment

The support (PK-1) was fed at a speed of 20 m/minute, and the rubbing treatment was given to the surface of the orientation film on the support (PK-1) by setting a rubbing roll (diameter 300 mm) so that the rubbing treatment was given to 45° against the longitudinal direction, and rotating it at 650 rpm. A contact length of the rubbing roll and the support (PK-1) was set to be 18 mm.

Formation of Optically Anisotropic Layer

An optically anisotropic layer (discotic liquid crystal compound layer) was formed by continuously applying a coating solution in which 41.01 kg of a discotic liquid crystal compound shown in General Formula (7) below, 4.06 kg of ethylene oxide modified trimethylolpropane triacrylate (V#360, by Osaka Organic Chemical Industry Ltd.), 0.45 kg of cellulose acetate butyrate (CAB531-1, by Eastman Chemical Co.), 1.35 kg of a photopolymerization initiator (Irgacure 907, by Ciba-Geigy Co.) and 0.45 kg of a sensitizer (Kayacure DETX, by Nippon Kayaku Co.) had been dissolved in 102 kg of methyl ethyl ketone, to which 0.1 kg of a fluoro fatty acid group-containing copolymer (Megafac F780, by Dainippon Ink & Chemicals, Inc.) had been then added, onto the surface of the orientation film on the support (PK-1) fed at 20 m/minute by rotating No. 3.4 wire bar at 391 rotation frequencies in the same direction as a feeding direction of the film.

General Formula (7)

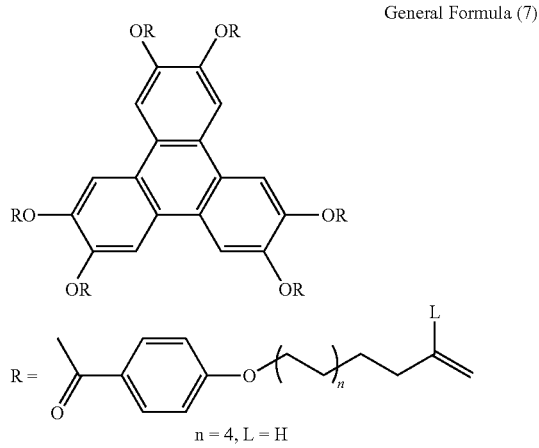

n = 4, L = H

The solvent was dried in a step of continuously raising the temperature from room temperature to 100° C. Subsequently, the discotic liquid crystal compound was oriented by heating in a drying zone at 130° C. for about 90 seconds so that a film surface wind speed of a discotic liquid crystal compound layer was 2.5 m/second.

Subsequently, the discotic liquid crystal compound was fixed in its orientation by feeding in the drying zone at 80° C. and irradiating ultraviolet ray with an illuminance of 600 mW by an ultraviolet ray irradiation apparatus (ultraviolet lamp: output 160 W/cm, emitting length: 1.6 m) for 4 seconds in a state where the surface temperature of the film was about 100° C. to advance a crosslinking reaction.

Thereafter, the temperature was cooled to the room temperature, and the film was rolled up in a cylindrical shape to make a roll-shaped form. A roll-shaped optical compensation film (KH-1) was made in this way.

The film surface temperature of the discotic liquid crystal compound layer was 127° C., and the viscosity of the layer at this temperature was 695 cp. The viscosity was obtained by measuring a liquid crystal layer (excluding the solvent) of the same composition ratio as the layer in a heating type E type viscosity meter.

Optical properties were measured by cutting out a part of the produced optical compensation film (KH-1) to use as a sample. For the retardation values Re of the optical compensation film (KH-1) measured at a wavelength of 546 nm, Re(0°), Re(40°) and Re(−40°) were 34.0 nm, 50.3 nm and 116.3 nm, respectively. The results are shown in Table 1.

The angle (tilt angle) between a discotic face of the discotic liquid crystal compound in the optically anisotropic layer and the support surface was continuously changed in a depth direction of the layer and was 32° in average.

Furthermore, only the optically anisotropic layer was peeled from the sample, and the average direction of the molecular symmetry axes in the optically anisotropic layer was measured. Consequently, the average direction was 45° against the longitudinal direction of the optical compensation film (KH-1).

An orientation of the liquid crystal compound was measured between a pair of polarizers (Glan-Thompson prism). When observing from an exit light side, a transmitting axis of a polarizing plate at an incident side was disposed at 90°, a slow axis of the transparent support was disposed at 20°, and a slow axis of the liquid crystal compound was disposed at 155°, and the polarizer at the exit light side was made 182°, the transmittance became the minimum, which was 0.0046.

Furthermore, the polarizing plate was disposed in cross Nicol and unevenness of the resulting optical compensation film was observed. Consequently, substantially no unevenness was detected when observed from the front and the direction inclined to 60° from the normal line.

Example 2

Production of Optical Compensation Film (KH-2)

Production of Support (PK-2)

A cellulose acetate solution was prepared by placing the following composition in the mixing tank and stirred with heating to dissolve respective components.

Composition of Materials and Solvents
  Cellulose acetate *[1]) 100 parts
  Triphenyl phosphate (plasticizer) 6.5 parts
  Biphenyldiphenyl phosphate (plasticizer) 5.2 parts
  Methylene chloride (first solvent) 500 parts
  Methanol (second solvent) 80 parts
  Retardation enhancer *[2]) 3.5 parts
*1) substitution degree: 2.81, acetylation degree: 60.2%
*2) shown General Formula (8) below General Formula (8)

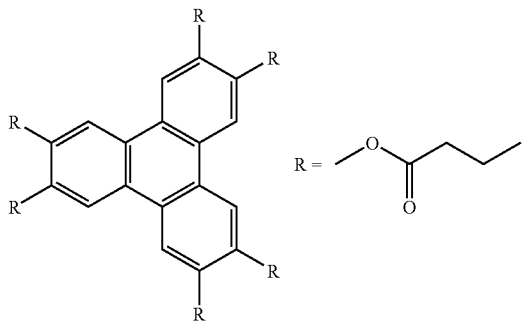

The resulting dope was flow-cast using the flow casting machine having the band with a width of 2 m and a length of 65 m. When the temperature on the film surface of the band became 40° C., the film was dried for one minute, and after peeling off, the film was further dried in the dry wind at 135° C. for 20 minutes to yield a tack film. This tack film was monoaxially drawn to 120% under a temperature condition of 185° C. to make a support (PK-2). The thickness of the resulting support (PK-2) was 88 μm.

Using the ellipsometer (M-150, by JASCO Co.), after regulating the humidity under an environment of 25° C. and 55% RH for 2 hours, the retardation value (Re) at a wavelength of 550 nm was measured, and consequently was 40.0 nm.

The retardation value (Rth) at a wavelength of 550 nm was measured, and consequently was 190.0 nm.

Likewise, the retardation values (Re) at wavelengths of 450 nm and 650 nm were measured, and consequently were 28 nm and 52 nm, respectively.

Also, the retardation values (Rth) at wavelengths of 450 nm and 650 nm were measured, and consequently were 203 nm and 183 nm, respectively. The results are shown in Table 1.

Onto the resulting support (PK-2), 10 mL/m² of 1.0 N potassium hydroxide solution (solvents: water/isopropyl alcohol/propylene glycol=62.9 parts/15 parts/15.8 parts) was applied, kept at about 40° C. for 30 seconds, an alkali solution was scraped, the support was washed with purified water, and water drops were eliminated with an air knife. Subsequently, the support was dried at 100° C. for 15 seconds. A contact angle of this support (PK-2) against the purified water was measured and consequently was 42°. These results of the support (PK-2) are shown in Table 1.

Production of Orientation Film

On this support (PK-2), 28 mL/m² of an orientation film coating solution of the following composition was applied using the No. 16 wire bar coater. An orientation film was made by drying in the hot wind at 60° C. for 60 seconds and further in the hot wind at 90° C. for 150 seconds.

| Composition for Orientation Film Coating Solution | |
| --- | --- |
| Modified polyvinyl alcohol*[1] | 10 parts |
| Water | 371 parts |
| Methanol | 119 parts |
| Glutaric aldehyde (crosslinker) | 0.5 part |
| Citrate ester AS3*[2] | 0.35 part |

*[1]expressed by General Formula (6) described above
*[2]by Sankyo Chemical Industry Co.

The film was dried in the hot wind at 25° C. for 60 seconds, at 60° C. for 60 seconds and at 90° C. for 150 seconds. The thickness of the orientation film after drying was 1.1 μm.

Surface roughness of the orientation film was measured using an atomic force microscope (AFM, SPI3800N, by Seiko Instruments, Inc.), and consequently was 1.147 nm.

Rubbing Treatment

The support (PK-2) was fed at a speed of 20 m/minute, and the rubbing treatment was given to the surface of the orientation film on the support (PK-2) by setting the rubbing roll (diameter 300 mm) so that the rubbing treatment was given to 45° against the longitudinal direction, and rotating it at 650 rpm. A contact length of the rubbing roll and the support (PK-2) was set to be 18 mm.

Formation of Optically Anisotropic Layer

An optically anisotropic layer (discotic liquid crystal compound layer) was formed by continuously applying the coating solution in which 41.01 kg of the discotic liquid crystal compound shown in General Formula (7) above, 4.06 kg of ethylene oxide modified trimethylolpropane triacrylate (V#360, by Osaka Organic Chemical Industry Ltd.), 0.23 kg of cellulose acetate butyrate (CAB531-1, by Eastman Chemical Co.), 0.14 kg of cellulose acetate butyrate (CAB551-0.2, by Eastman Chemical Co.), 1.35 kg of the photopolymerization initiator (Irgacure 907, by Ciba-Geigy Co.) and 0.45 kg of the sensitizer (Kayacure DETX, by Nippon Kayaku Co.) had been dissolved in 102 kg of methyl ethyl ketone, to which 0.1 kg of the fluoro fatty acid group-containing copolymer (Megafac F780, by Dainippon Ink & Chemicals, Inc.) had been then added, onto the surface of the orientation film on the support (PK-1) fed at 20 m/minute by rotating the No. 3.6 wire bar at 391 rotation frequencies in the same direction as the feeding direction of the film.

The solvent was dried in the step of continuously raising the temperature from room temperature to 100° C. Subsequently, the discotic liquid crystal compound was oriented by heating in the drying zone at 130° C. for about 90 seconds so that the film surface wind speed of a discotic liquid crystal compound layer was 2.5 m/second.

Subsequently, the discotic liquid crystal compound was fixed in its orientation by feeding in the drying zone at 80° C. and irradiating ultraviolet ray with an illuminance of 600 mW by the ultraviolet ray irradiation apparatus (ultraviolet lamp: output 160 W/cm, emitting length: 1.6 m) for 4 seconds in the state where the surface temperature of the film was about 100° C. to advance the crosslinking reaction.

Thereafter, the temperature was cooled to the room temperature, and the film was rolled up in the cylindrical shape to make the roll-shaped form. A roll-shaped optical compensation film (KH-2) was made in this way.

The film surface temperature of the discotic liquid crystal compound layer was 127° C., and the viscosity of the layer at this temperature was 695 cp. The viscosity was obtained by measuring the liquid crystal layer (excluding the solvent) of the same composition ratio as the layer in the heating type E type viscosity meter.

Optical properties were measured by cutting out a part of the produced optical compensation film (KH-2) to use as the sample. For the retardation values Re of the optical compensation film (KH-2) measured at a wavelength of 546 nm, Re(0°), Re(40°) and Re(−40°) were 40.3 nm, 46.1 nm and 129.1 nm, respectively. The results are shown in Table 1.

The angle (tilt angle) between the discotic face of the discotic liquid crystal compound in the optically anisotropic layer and the support surface was continuously changed in the depth direction of the layer and was 32° in average.

Furthermore, only the optically anisotropic layer was peeled from the sample, and the average direction of the molecular symmetry axes in the optically anisotropic layer was measured. Consequently, the average direction was 45° against the longitudinal direction of the optical compensation film (KH-2).

The orientation of the liquid crystal compound was measured between a pair of polarizers (Glan-Thompson prism). When observing from the exit light side, the transmitting axis of the polarizing plate at the incident side was disposed at 90°, the slow axis of the transparent support was disposed at 20°, and the slow axis of the liquid crystal compound was disposed at 155°, and the polarizer at the exit light side was made 182°, the transmittance became the minimum, which was 0.0030.

Furthermore, the polarizing plate was disposed in cross Nicol and unevenness of the resulting optical compensation film was observed. Consequently, substantially no unevenness was detected when observed from the front and the direction inclined to 60° from the normal line.

Comparative Example 1

Production of Support (PK-H1)

A cellulose acetate solution was prepared by placing the following composition in the mixing tank and stirred with heating to dissolve respective components.

| Composition of Cellulose Acetate Solution | |
|---|---|
| Cellulose acetate[*1)] | 100 parts |
| Triphenyl phosphate (plasticizer) | 7.8 parts |
| Biphenyldiphenyl phosphate (plasticizer) | 3.9 parts |
| Methylene chloride (first solvent) | 300 parts |
| Methanol (second solvent) | 45 parts |
| Dye 360FP[*2)] | 0.0009 part |

[*1)]acetylation degree of 60.9%
[*2)]by Sumitomo Chemical Co.

In another mixing tank, 16 parts by mass of the retardation enhancer shown in General Formula (5) above, 80 parts by mass of methylene chloride and parts by mass of methanol were placed, and stirred with heating to prepare a retardation enhancer solution.

To 464 parts by mass of the cellulose acetate solution of the above composition, 36 parts by mass of the retardation enhancer solution and 1.1 parts by mass of silica fine particles (by Aerosil Co.) were mixed, which was then thoroughly stirred to prepare a dope. The amount of the added retardation enhancer was 5.0 parts by mass relative to 100 parts by mass of cellulose acetate. The amount of the added silica fine particles was 0.15 parts by mass relative to 100 parts by mass of cellulose acetate.

The resulting dope was flow-cast using the flow casting machine having the band with a width of 2 m and a length of 65 m. When the temperature on the film surface on the band became 40° C., the film was dried for one minute, and after peeling off, the film was drawn 28% to the width direction in the dry wind at 140° C. using the tenter.

Subsequently, a support (PK-H1) containing 0.3% by mass remaining solvent was produced by drying in the dry wind at 135° C. for 20 minutes. The resulting support (PK-H1) had the width of 1340 mm and the thickness of 92 μm. When measured at a wavelength of 550 nm using the ellipsometer (M-150, by JASCO Co.), the retardation value (Re) was 38 nm.

The retardation value (Rth) at a wavelength of 550 nm was measured and was 175 nm. Likewise, the retardation values (Re) at wavelengths of 450 nm and 650 nm were 39 nm and 38 nm, respectively. Also, the retardation values (Rth) at wavelengths of 450 nm and 650 nm were 176 nm and 173 nm, respectively. These results are shown Table 1.

Onto the resulting support (PK-1), 10 mL/m$^2$ of 1.0 N potassium hydroxide solution (solvents: water/isopropyl alcohol/propylene glycol=62.9 parts/15 parts/15.8 parts) was applied, kept at about 40° C. for 30 seconds, an alkali solution was scraped, the support was washed with purified water, and water drops were eliminated with the air knife. Subsequently, the support was dried at 100° C. for 15 seconds. The contact angle of this support (PK-h1) against the purified water was 42°. These results are shown in Table 1.

Production of Orientation Film

On this support (PK-H1) (surface treated with alkali), 28 mL/m$^2$ of an orientation film coating solution of the following composition was applied using the No. 16 wire bar coater. An orientation film was made by drying in the hot wind at 60° C. for 60 seconds and further in the hot wind at 90° C. for 150 seconds.

| Composition for Orientation Film Coating Solution | |
|---|---|
| Modified polyvinyl alcohol[*1)] | 10 parts |
| Water | 371 parts |
| Methanol | 119 parts |
| Glutaric aldehyde (crosslinker) | 0.5 parts |
| Citrate ester AS3 | 0.35 part |

[*1)]expressed by General Formula (6) described above
[*2)]by Sankyo Chemical Industry Co., Ltd.

Rubbing Treatment

The support (PK-H1) was fed at a speed of 20 m/minute, and the rubbing treatment was given to the surface of the orientation film on the support (PK-H1) by setting the rubbing roll (diameter 300 mm) so that the rubbing treatment was given to 45° against the longitudinal direction, and rotating it at 650 rpm. The contact length of the rubbing roll and the support (PK-H1) was set to be 18 mm.

Formation of Optically Anisotropic Layer

An optically anisotropic layer (discotic liquid crystal compound layer) was formed by continuously applying the coating solution in which 41.01 kg of the discotic liquid crystal compound shown in General Formula (7) above, 4.06 kg of ethylene oxide modified trimethylolpropane triacrylate (V#360, by Osaka Organic Chemical Industry Ltd.), 0.45 kg of cellulose acetate butyrate (CAB531-1, by Eastman Chemical Co.), 1.35 kg of the photopolymerization initiator (Irgacure 907, by Ciba-Geigy Co.) and 0.45 kg of the sensitizer (Kayacure DETX, by Nippon Kayaku Co.) had been dissolved in 102 kg of methyl ethyl ketone, to which 0.1 kg of a fluoro fatty acid group-containing copolymer (Megafac F780, by Dainippon Ink & Chemicals, Inc.) had been then added, onto the surface of the orientation film on the support (PK-H1) fed at 20 m/minute by rotating a #3.0 wire bar at 391 rotation frequencies in the same direction as the feeding direction of the film.

The solvent was dried in the step of continuously raising the temperature from room temperature to 100° C. Subsequently, the discotic liquid crystal compound was oriented by heating in the drying zone at 130° C. for about 90 seconds so that the film surface wind speed of the discotic liquid crystal compound layer was 2.5 m/second.

Subsequently, the discotic liquid crystal compound was fixed in its orientation by feeding in the drying zone at 80° C. and irradiating ultraviolet ray with an illuminance of 600 mW by the ultraviolet ray irradiation apparatus (ultraviolet lamp: output 160 W/cm, emitting length: 1.6 m) for 4 seconds in the state where the surface temperature of the film was about 100° C. to advance the crosslinking reaction.

Thereafter, the temperature was cooled to the room temperature, and the film was rolled up in the cylindrical shape to make the roll-shaped form. A roll-shaped optical compensation film (KH-H1) was made in this way.

The film surface temperature of the discotic liquid crystal compound layer was 127° C., and the viscosity of the layer at this temperature was 695 cp. The viscosity was obtained by measuring the liquid crystal layer (excluding the solvent) of the same composition ratio as the layer in the heating type E type viscosity meter.

Optical properties were measured by cutting out a part of the produced optical compensation film (KH-H1) to use as the sample. For the retardation values Re of the optical compensation film (KH-H1) measured at a wavelength of 546 nm, Re(0°), Re(40°) and Re(−40°) were 30.5 nm, 44.5 nm and 107.5 nm, respectively. The results are shown in Table 1.

The angle (tilt angle) between the discotic face of the discotic liquid crystal compound in the optically anisotropic layer and the support surface was continuously changed in the depth direction of the layer and was 32° in average.

Furthermore, only the optically anisotropic layer was peeled from the sample, and the average direction of the molecular symmetry axes in the optically anisotropic layer was measured. Consequently, the average direction was 45° against the longitudinal direction of the optical compensation film (KH-H1).

An orientation of the liquid crystal compound was measured between a pair of polarizers (Glan-Thompson prism). When observing from the exit light side, the transmitting axis of the polarizing plate at the incident side was disposed at 90°, the slow axis of the transparent support was disposed at 20°, and the slow axis of the liquid crystal compound was disposed at 155°, and the polarizer at the exit light side was made 182°, the transmittance became the minimum, which was 0.0033.

Furthermore, the polarizing plate was disposed in cross Nicol and unevenness of the resulting optical compensation film was observed. Consequently, substantially no unevenness was detected when observed from the front and the direction inclined to 600 from the normal line.

Comparative Example 2-1

Production of Support

The retardation enhancer solution made in Example 1 was mixed with the cellulose acetate solution made in Example 1, and the mixture was thoroughly stirred to prepare a dope. The amount of the added retardation enhancer was 7.5 parts by mass relative to 100 parts by mass of cellulose acetate.

A support (PK-H2-1) containing 0.3% by mass remaining solvent was produced by flow casting the resulting dope using the same band flow casting machine as in Example 1 in the same way as in Example 1, except that a drawing scale was 20%. The resulting support (PK-H2-1) had the width of 1500 mm and the thickness of 95 µm.

When measured at a wavelength of 550 nm using the ellipsometer (M-150, by JASCO Co.), the retardation value (Re) was 35 nm. The retardation value (Rth) at a wavelength of 550 nm was 200 nm.

Likewise, the retardation values (Re) measured at wavelengths of 450 nm and 650 nm were 38 nm and 33 nm, respectively.

Also, the retardation values (Rth) measured at wavelengths of 450 nm and 650 nm were 209 nm and 192 nm, respectively. These results are shown Table 1.

The support (PK-H2-1) was immersed in 2.0 N potassium hydroxide solution (25° C.) for 2 minutes. Then the support was neutralized with sulfuric acid, washed with purified water and dried. A surface energy of the support (PK-H2) measured by a contact angle method was 63 mN/m. These results together with the A1 value and the A2 value in the support (PK-H2-1) are shown in Table 1.

Production of Orientation Film

On the produced support (PK-H2-1), 28 mL/m$^2$ of a coating solution of the following composition was applied using the No. 16 wire bar coater. The film was dried in the hot wind at 60° C. for 60 seconds and further at 90° C. for 150 seconds.

| Composition for Orientation Film Coating Solution | |
|---|---|
| Modified polyvinyl alcohol*[1)] | 10 parts |
| Water | 371 parts |
| Methanol | 119 parts |
| Glutaric aldehyde (crosslinker) | 0.5 part |

*[1)]expressed by General Formula (6) shown above

The support (PK-H2-1) was fed at a speed of 20 m/minute, and the rubbing treatment was given to the surface of the orientation film on the support (PK-H2-1) by setting the rubbing roll (diameter 300 mm) so that the rubbing direction was 45° against the longitudinal direction, and rotating it at 450 rpm.

Formation of Optically Anisotropic Layer

An optically anisotropic layer (discotic liquid crystal compound layer) was formed by continuously applying a coating solution in which 41.01 kg of a discotic liquid crystal compound of Example 1, 4.06 kg of ethylene oxide modified trimethylolpropane triacrylate (V#360, by Osaka Organic Chemical Industry Ltd.), 0.68 kg of cellulose acetate butyrate (CAB531-1, by Eastman Chemical Co.), 1.35 kg of the photopolymerization initiator (Irgacure 907, by Ciba-Geigy Co.) and 0.45 kg of the sensitizer (Kayacure DETX, by Nippon Kayaku Co.) had been dissolved in 98 kg of methyl ethyl ketone, to which 0.1 kg of a fluoro fatty acid group-containing copolymer (P-29) had been then added, onto the surface of the orientation film on the support (PK-H2-1) fed at 20 m/minute by rotating No. 3.8 wire bar at 391 rpm in the same direction as the feeding direction of the film.

The solvent was dried in the step of continuously raising the temperature from room temperature to 100° C. Subsequently, the discotic liquid crystal compound was oriented by heating in the drying zone at 135° C. for about 90 seconds so that the film surface wind speed of the discotic liquid crystal compound layer was 1.5 m/second.

Subsequently, the discotic liquid crystal compound was fixed in its orientation by feeding in the drying zone at 80° C. and irradiating ultraviolet ray with an illuminance of 600 mW by the ultraviolet ray irradiation apparatus (ultraviolet lamp: output 160 W/cm, emitting length: 1.6 m) for 4 seconds in the state where the surface temperature of the film was about 100° C. to advance the crosslinking reaction.

Thereafter, the temperature was cooled to the room temperature, and the film was rolled up in the cylindrical shape to make the roll-shaped form. A roll-shaped optical compensation film (KH-H2-1) was made in this way.

The film surface temperature of the discotic liquid crystal compound layer was 131° C., and the viscosity of the layer at this temperature was 600 cp. The viscosity was obtained by measuring the liquid crystal layer (excluding the solvent) of the same composition ratio as the layer in the heating type E type viscosity meter.

Optical properties were measured by cutting out a part of the produced optical compensation film (KH-H2-1) to use as the sample.

For the retardation values Re of the optical compensation film (KH-H2-1) measured at a wavelength of 546 nm, Re(0°), Re(40°) and Re(−40°) were 43.5 nm, 46.5 nm and 118.6 nm, respectively. The results are shown in Table 1.

The angle (tilt angle) between the discotic face of the discotic liquid crystal compound in the optically anisotropic layer and the support surface was continuously changed in the depth direction of the layer and was 33° in average.

Furthermore, only the optically anisotropic layer was peeled from the sample, and the average direction of the molecular symmetry axes in the optically anisotropic layer was measured. Consequently, the average direction was 45.5° against the longitudinal direction of the optical compensation film (KH-H2-1).

The orientation of the liquid crystal compound was measured between a pair of polarizers (Glan-Thompson prism). When observing from the exit light side, the transmitting axis of the polarizing plate at the incident side was disposed at 90°, the slow axis of the transparent support was disposed at 20°, and the slow axis of the liquid crystal compound was disposed at 155°, and the polarizer at the exit light side was made 181°, the transmittance became the minimum, which was 0.0043.

Furthermore, the polarizing plate was disposed in cross Nicol and unevenness of the resulting optical compensation film was observed. Consequently, substantially no unevenness was detected when observed from the front and the direction inclined to 60° from the normal line.

Comparative Example 2-2

Production of Support

The support (PK-2) produced in Example 2 was also used in this comparative example.

The support (PK-2) was immersed in 2.0 N potassium hydroxide solution (25° C.) for 2 minutes. Then the support was neutralized with sulfuric acid, washed with purified water and dried. A surface energy of the support measured by a contact angle method was 63 mN/m.

Production of Orientation Film

On the produced support, 28 mL/m$^2$ of a coating solution of the following composition was applied using the No. 16 wire bar coater. The film was dried in the hot wind at 60° C. for 60 seconds and further at 90° C. for 150 seconds.

| Composition for Orientation Film Coating Solution | |
|---|---|
| Modified polyvinyl alcohol*[1] | 10 parts |
| Water | 371 parts |
| Methanol | 119 parts |
| Glutaric aldehyde (crosslinker) | 0.5 part |

*[1]expressed by General Formula (6) shown above

The support was fed at a speed of 20 m/minute, and the rubbing treatment was given to the surface of the orientation film on the support by setting the rubbing roll (diameter 300 mm) so that the rubbing direction was 45° against the longitudinal direction, and rotating it at 450 rpm.

Formation of Optically Anisotropic Layer

An optically anisotropic layer (discotic liquid crystal compound layer) was formed by continuously applying a coating solution in which 41.01 kg of a discotic liquid crystal compound of Example 1, 4.06 kg of ethylene oxide modified trimethylolpropane triacrylate (V#360, by Osaka Organic Chemical Industry Ltd.), 0.68 kg of cellulose acetate butyrate (CAB531-1, by Eastman Chemical Co.), 1.35 kg of the photopolymerization initiator (Irgacure 907, by Ciba-Geigy Co.) and 0.45 kg of the sensitizer (Kayacure DETX, by Nippon Kayaku Co.) had been dissolved in 98 kg of methyl ethyl ketone, to which 0.1 kg of a fluoro fatty acid group-containing copolymer (P-29) had been then added, onto the surface of the orientation film on the support fed at 20 m/minute by rotating No. 3.6 wire bar at 391 rpm in the same direction as the feeding direction of the film.

The solvent was dried in the step of continuously raising the temperature from room temperature to 100° C. Subsequently, the discotic liquid crystal compound was oriented by heating in the drying zone at 130° C. for about 90 seconds so that the film surface wind speed of the discotic liquid crystal compound layer was 2.0 m/second.

Subsequently, the discotic liquid crystal compound was fixed in its orientation by feeding in the drying zone at 80° C. and irradiating ultraviolet ray with an illuminance of 600 mW by the ultraviolet ray irradiation apparatus (ultraviolet lamp: output 160 W/cm, emitting length: 1.6 m) for 4 seconds in the state where the surface temperature of the film was about 100° C. to advance the crosslinking reaction.

Thereafter, the temperature was cooled to the room temperature, and the film was rolled up in the cylindrical shape to make the roll-shaped form. A roll-shaped optical compensation film (KH-H2-2) was made in this way.

The film surface temperature of the discotic liquid crystal compound layer was 127° C., and the viscosity of the layer at this temperature was 695 cp. The viscosity was obtained by measuring the liquid crystal layer (excluding the solvent) of the same composition ratio as the layer in the heating type E type viscosity meter.

Optical properties were measured by cutting out a part of the produced optical compensation film (KH-H2-2) to use as the sample.

For the retardation values Re of the optical compensation film (KH-H2-2) measured at a wavelength of 546 nm, Re(0°), Re(40°) and Re(−40°) were 39.0 nm, 45.1 nm and 142.0 nm, respectively. The results are shown in Table 1.

The angle (tilt angle) between the discotic face of the discotic liquid crystal compound in the optically anisotropic layer and the support surface was continuously changed in the depth direction of the layer and was 330 in average.

Furthermore, only the optically anisotropic layer was peeled from the sample, and the average direction of the molecular symmetry axes in the optically anisotropic layer was measured. Consequently, the average direction was 45.5° against the longitudinal direction of the optical compensation film (KH-H2-2).

The orientation of the liquid crystal compound was measured between a pair of polarizers (Glan-Thompson prism). When observing from the exit light side, the transmitting axis of the polarizing plate at the incident side was disposed at 90°, the slow axis of the transparent support was disposed at 200, and the slow axis of the liquid crystal compound was disposed at 155°, and the polarizer at the exit light side was made 181°, the transmittance became the minimum, which was 0.0043.

Furthermore, the polarizing plate was disposed in cross Nicol and unevenness of the resulting optical compensation film was observed. Consequently, substantially no unevenness was detected when observed from the front and the direction inclined to 60° from the normal line.

The saponification treatment was given to the triacetyl cellulose film (TD-80U, by FUJIFILM Co.) having the thickness of 80 μm, which was then attached to another side of the polarizer (HF-1) using the polyvinyl alcohol based adhesive.

All of the longitudinal direction of the polarizer (HF-1), the longitudinal direction of the support (PK-2) and the longitudinal direction of the commercially available triacetyl cellu-

TABLE 1

|  | Re (nm) | | | Rth (nm) | | | | | |
| --- | --- | --- | --- | --- | --- | --- | --- | --- | --- |
|  | 450 nm | 550 nm | 650 nm | 450 nm | 550 nm | 650 nm | Re (0°) | Re (40°) | Re (−40°) |
| Ex 1 | 40 | 39 | 38 | 193 | 190 | 185 | 34.0 | 50.3 | 116.3 |
| Ex. 2 | 28 | 40 | 52 | 203 | 190 | 183 | 34.5 | 48.7 | 118.0 |
| Com. Ex. 1 | 39 | 38 | 38 | 176 | 175 | 173 | 30.5 | 44.5 | 107.5 |
| Com. Ex. 2 | 38 | 35 | 33 | 209 | 200 | 192 | 37.3 | 51.2 | 120.5 |

Example 3

Production of Polarizing Plate (HB-1A)

Iodine was absorbed to the drawn polyvinyl alcohol film to make a polarizer (HF-1), and using a polyvinyl alcohol based additive, KH-1 (optical compensation film) was attached to one side of the polarizer (HF-1) on the support (PK-1) surface.

A saponification treatment was given to a triacetyl cellulose film (TD-80U, by FUJIFILM Co.) having the thickness of 80 μm, which was then attached to another side of the polarizer (HF-1) using the polyvinyl alcohol based adhesive.

All of the longitudinal direction of the polarizer (HF-1), the longitudinal direction of the support (PK-1) and the longitudinal direction of the commercially available triacetyl cellulose film were disposed in parallel. A polarizing plate (HB-1A) was made in this way.

Example 4

Production of Polarizing Plate (HB-1B)

Iodine was absorbed to the drawn polyvinyl alcohol film to make a polarizer (HF-1), and using a polyvinyl alcohol based additive, KH-1 (optical compensation film) was attached to one side of the polarizer (HF-1) on the support (PK-1) surface.

The saponification treatment was given to a film with reflection prevention function (CV film, clear view UA, by FUJIFILM Co.), which was then attached to another side of the polarizer (HF-1) using the polyvinyl alcohol based adhesive.

All of the longitudinal direction of the polarizer (HF-1), the longitudinal direction of the support (PK-1) and the longitudinal direction of the commercially available triacetyl cellulose film were disposed in parallel. A polarizing plate (HB-1B) was made in this way.

Example 5

Production of Polarizing Plate (HB-2)

Iodine was absorbed to the drawn polyvinyl alcohol film to make a polarizer (HF-1), and using a polyvinyl alcohol based additive, the optical compensation film (KH-2) was attached to one side of the polarizer (HF-1) on the support (PK-2) surface.

lose film were disposed in parallel. A polarizing plate (HB-2) was made in this way.

Comparative Example 3

Production of Polarizing Plate (HB-H1)

A polarizing plate (HB-H1) was made in the same way as Example 3 except for using the optical compensation film (KH-H1).

Comparative Example 4

Production of Polarizing Plate (HB-H2)

A polarizing plate (HB-H2) was made in the same way as Example 3 except for using the optical compensation film (KH-H2).

Example 6

Production of Bend Alignment Liquid Crystal Cell

A polyimide film as the orientation film was provided on a glass substrate equipped with an ITO electrode, and the rubbing treatment was given to the orientation film. Two resulting glass substrates were faced one another in arrangement where the rubbing directions were parallel, and a cell gap was set to be 4.5 μm.

A liquid crystal compound having Δn of 0.1396 (ZLI1132, Merck Co.) was injected in the cell gap to make a liquid crystal cell having the bend alignment. A size of the liquid crystal cell was 20 inches. Therefore, the product Δn×d of the cell gap "d" and the refractive index anisotropy Δn is determined to be 628.2 nm in this liquid crystal. The size of the liquid crystal cell was 20 inches.

The polarizing plate (HB-1A) and the polarizing plate (HB-1B) made in Examples 3 and 4, respectively were attached to sandwich the bend alignment liquid crystal cell produced. They were disposed so that the optically anisotropic layer of the polarizing plate was faced to the glass substrate and the rubbing direction of the liquid crystal cell and the rubbing direction of the optically anisotropic layer faced thereto were anti-parallel.

A rectangular wave voltage of 55 Hz was applied to the liquid crystal cell. The liquid crystal cell had a normally white mode of white display 2V and black display 5V. The view angles in eight stages from the black display (L1) to the white display (L8) were measured by making the ratio of transmittance (white display/black display) a contrast ratio and using a measuring device (EZ-Contrast 160D, by ELDI Co.). A front contrast (CR: luminance of white display/luminance of black display) was also obtained. The transmittance of the liquid crystal cell was obtained from luminance of white display/luminance of only back light. These results are shown in Table 2.

Comparative Example 5

Production of Bend Alignment Liquid Crystal Cell

A liquid crystal display device was made in the same way as in Example 6, except that the polarizing plate was changed to the polarizing plate (HB-H1) made in Comparative Example 3, and the view angles were measured. The results are shown in Table 2.

The rectangular wave voltage of 55 Hz was applied to the liquid crystal cell. The liquid crystal cell had the normally white mode of white display 2V and black display 5V. The voltage at which the transmittance in the front was minimized, i.e., a black voltage was applied, and a black display transmittance (%) in the view angle in the direction of an azimuthal angle 0° and a polar angle 60° at that time was obtained. The results are shown in Table 2.

The view angles in eight stages from the black display (L1) to the white display (L8) were measured by making the ratio of transmittance (white display/black display) the contrast ratio and using the measuring device (EZ-Contrast 160D, ELDI Co.). The results are shown in Table 3.

TABLE 2

| | Front | View Angle (contrast >10) | | Transmissivity |
| --- | --- | --- | --- | --- |
| | Contrast | upper/lower | left/right | |
| Ex. 6 | 750 | 80°/80° | 80°/80° | 3.00% |
| Com. Ex. 4 | 480 | 80°/80° | 80°/80° | 1.70% |

Evaluation

Evaluation of Unevenness in Panel

The whole area of the liquid crystal display in Example 6 was adjusted to an intermediate tone, and unevenness was evaluated. No unevenness was observed when seen from any directions.

Example 7

Production of Bend Alignment Liquid Crystal Cell

A polyimide film as the orientation film was provided on the glass substrate equipped with the ITO electrode, and the rubbing treatment was given to the orientation film. Two resulting glass substrates were faced one another in arrangement where the rubbing directions were parallel, and the cell gap was set to be 5.2 μm.

The liquid crystal compound having Δn of 0.1396 (ZLI1132, Merck Co.) was injected in the cell gap to make a bend alignment liquid crystal cell. Therefore, the product Δn×d of the cell gap "d" and the refractive index anisotropy Δn is determined to be 725.9 nm in this liquid crystal. The size of the liquid crystal cell was 20 inches.

Two polarizing plates (HB-2) made in Example 5 were attached to sandwich the bend alignment liquid crystal cell produced. They were disposed so that the optically anisotropic layer of the elliptic polarizing plate was faced to the glass substrate and the rubbing direction of the liquid crystal cell and the rubbing direction of the optically anisotropic layer faced thereto were anti-parallel.

The rectangular wave voltage of 55 Hz was applied to the liquid crystal cell. The liquid crystal cell had the normally white mode of white display 2V and black display 6V. The view angles in eight stages from the black display (L1) to the white display (L8) were measured by making the ratio of transmittance (white display/black display) the contrast ratio and using the measuring device (EZ-Contrast 160D, by ELDI Co.). The results are shown in Table 3.

The voltage at which the transmittance in the front was minimized, i.e., the black voltage was applied, and the black display transmittance (%) in the view angle in the direction of the azimuthal angle 0° and the polar angle 60°, and a color shift (Δx) between the azimuthal angle 0°, the polar angle 60° and the azimuthal angle 180°, the polar angle 60° were obtained at that time. The results are shown in Table 4.

In table 4, the "color shift" indicates a sum of Δu' v' in the azimuthal angle 0°; u' v' (polar angle 0°) and Δu' v' in the azimuthal angle 180°; u' v' (polar angle 0°) (u' v': color coordinates in CIRLAB space).

Comparative Example 6

Production of Bend Alignment Liquid Crystal Cell

A liquid crystal display device was made in the same way as in Example 7, except that the polarizing plate was changed to the polarizing plate (HB-H2-1) made in Comparative Example 2-1, and the view angles were measured.

The rectangular wave voltage of 55 Hz was applied to the liquid crystal cell. The liquid crystal cell had the normally white mode of white display 2V and black display 5V.

The view angles in eight stages from the black display (L1) to the white display (L8) were measured by making the ratio of transmittance (white display/black display) the contrast ratio and using the measuring device (EZ-Contrast 160D, by ELDI Co.). Then the luminance was examined for entire directions as regarding the occurrence of inversion in the luminance tone. The results are shown in Table 3.

Furthermore, the voltage at which the transmittance in the front was minimized, i.e., the black voltage was applied, and the black display transmittance (%) in the view angle in the direction of an azimuthal angle 0° and a polar angle 60°, and a color shift (Δx) between the azimuthal angle 0°, the polar angle 60° and the azimuthal angle 180°, the polar angle 60° were obtained at that time. The results are shown in Table 4.

Comparative Example 7

Production of Bend Alignment Liquid Crystal Cell

A liquid crystal display device was made in the same way as in Example 7, except that the polarizing plate was changed to the polarizing plate (HB-H2-2) made in Comparative Example 2-2, and the view angles were measured.

The rectangular wave voltage of 55 Hz was applied to the liquid crystal cell. The liquid crystal cell had the normally white mode of white display 2V and black display 5V.

The view angles in eight stages from the black display (L1) to the white display (L8) were measured by making the ratio of transmittance (white display/black display) the contrast ratio and using the measuring device (EZ-Contrast 160D, by ELDI Co.). Then the luminance was examined for entire directions as regarding the occurrence of inversion in the luminance tone. The results are shown in Table 3.

Furthermore, the voltage at which the transmittance in the front was minimized, i.e., the black voltage was applied, and the black display transmittance (%) in the view angle in the direction of an azimuthal angle 0° and a polar angle 60°, and a color shift (Δx) between the azimuthal angle 0°, the polar angle 60° and the azimuthal angle 180°, the polar angle 60° were obtained at that time. The results are shown in Table 4.

TABLE 3

| | Front | View Angle (contrast >10) | | Trans- | Tone Inversion |
|---|---|---|---|---|---|
| | Contrast | upper/lower | left/right | missivity | (8 steps) |
| Ex. 7 | 800 | 80°/80° | 80°/80° | 3.60% | non |
| Com. Ex. 6 | 650 | 75°/75° | 75°/75° | 3.80% | non |
| Com. Ex. 7 | 531 | 80°/80° | 80°/80° | 3.50% | occur |

TABLE 4

| | Re/Rth | | | Color | |
|---|---|---|---|---|---|
| | 450 nm | 550 nm | 650 nm | Shift | Transmissivity |
| Ex. 7 | 0.18 | 0.28 | 0.38 | 0.05 | 0.01 |
| Com. Ex. 6 | 0.22 | 0.22 | 0.22 | 0.40 | 0.08 |

As shown in Tables 2 to 4, it has been confirmed that the liquid crystal display device in Example 7 has the excellent optical compensation function, remarkably improved view angle contrasts and the high transmittance compared with the liquid crystal display device in Comparative Example 6.

The polarizing plate of the present invention enables visual angle compensation of the black state at almost all wavelengths particularly in the OCB mode and the HAN mode, further can remarkably reduce a display grade change due to the environment, particularly reduce a light through in an oblique direction upon display of black and can be suitably used for the liquid crystal display device where the view angle contrast has been remarkably improved.

The liquid crystal display device of the present invention can optically compensate the liquid crystal cell, improve the contrast, reduce the color shift depending on the visible angle direction and be used for mobile phones, monitors for personal computers, televisions and liquid crystal projectors.

According to the present invention, it is possible to provide an optical compensation film having an excellent optical compensation function for a liquid crystal display device, particularly the liquid crystal display device with an OCB mode having a fast response speed and a moving-image fitness.

The present invention can also provide a polarizing plate having a polarization function, as well as having the excellent optical compensation function for a liquid crystal display device, particularly the liquid crystal display device with the OCB mode having the fast response speed and the moving-image fitness, and capable of further contributing to thinning the liquid crystal display device.

Further, the present invention can provide a liquid crystal display device capable of displaying an image having an high display grade, particularly the liquid crystal display device with the OCB mode having the fast response speed and the moving-image fitness and a high transmittance.

What is claimed is:

1. An optical compensation film, comprising a longitudinal direction and an in-plane refractive-index-reducing direction,
    wherein the optical compensation film satisfies the following optical properties within a plane through which the normal line of the optical compensation film and the direction of 45° inclined from the longitudinal direction toward the in-plane refractive-index-reducing direction pass:
    (i) a retardation value Re(0°) measured in the normal line direction using a light of wavelength 550 nm is in a range of 37±6 nm;
    (ii) a retardation value Re(40°) measured in a direction inclined 40°, toward the plane of the optical compensation film, from the normal line using a light of wavelength 550 nm is in a range of 50±6 nm; and
    (iii) a retardation value Re(−40°) measured in a direction inclined 40°, to the direction opposite to the direction of (ii), from the normal line using a light of wavelength 550 nm is in a range of 124±12 nm.

2. The optical compensation film according to claim 1, further comprising a support and an optically anisotropic layer that comprises an orientation-fixed liquid crystal compound.

3. The optical compensation film according to claim 2, wherein the support has an in-plane slow axis other than orthogonal or parallel with the in-plane slow axis of the optically anisotropic layer.

4. The optical compensation film according to claim 2, wherein the support has an A1 value, calculated from the following Formula (1), in a range of 0.10 to 0.95, and an A2 value, calculated from the following Formula (2), in a range of 1.01 to 1.50;

$$A1 \text{ value} = Re_{(450)}/Re_{(550)} \quad \text{Formula (1)}$$

$$A2 \text{ value} = Re_{(650)}/Re_{(550)} \quad \text{Formula (2)},$$

wherein $Re_{(450)}$ is an in-plane retardation value of the support for a light of wavelength 450 nm, $Re_{(550)}$ is an in-plane retardation value of the support for a light of wavelength 550 nm, and $Re_{(650)}$ is an in-plane retardation value of the support for a light of wavelength 650 nm.

5. A method for producing a polarizing plate, comprising laminating a optical compensation film with a polarizing film,
    wherein the optical compensation film comprises a longitudinal direction and an in-plane refractive-index-reducing direction on the basis of the longitudinal direction, and
    the optical compensation film satisfies the following optical properties within a plane through which the normal line of the optical compensation film and the direction of 45° inclined from the longitudinal direction toward the in-plane refractive-index-reducing direction pass:
    (i) a retardation value Re(0°) measured in the normal line direction using a light of wavelength 550 nm is in a range of 37±6 nm;
    (ii) a retardation value Re(40°) measured in a direction inclined 40°, toward the plane of the optical compensation film, from the normal line using a light of wavelength 550 nm is in a range of 50±6 nm; and
    (iii) a retardation value Re(−40°) measured in a direction inclined 40°, to the direction opposite to the direction of (ii), from the normal line using a light of wavelength 550 nm is in a range of 124±12 nm.

6. A method for producing a polarizing plate, comprising laminating a optical compensation film, which being formed into a roll shape, with a polarizing film in a way of roll-to-roll,
wherein the optical compensation film comprises a longitudinal direction and an in-plane refractive-index-reducing direction on the basis of the longitudinal direction, and
the optical compensation film satisfies the following optical properties within a plane through which the normal line of the optical compensation film and the direction of 45° inclined from the longitudinal direction toward the in-plane refractive-index-reducing direction pass:
(i) a retardation value Re(0°) measured in the normal line direction using a light of wavelength 550 nm is in a range of 37±6 nm;
(ii) a retardation value Re(40°) measured in a direction inclined 40°, toward the plane of the optical compensation film, from the normal line using a light of wavelength 550 nm is in a range of 50±6 nm; and
(iii) a retardation value Re(−40°) measured in a direction inclined 40°, to the direction opposite to the direction of (ii), from the normal line using a light of wavelength 550 nm is in a range of 124±12 nm.

7. A polarizing plate, produced by a method comprising laminating an optical compensation film, which being formed into a roll shape, with a polarizing film in a way of roll-to-roll,
wherein the optical compensation film comprises a longitudinal direction and an in-plane refractive-index-reducing direction on the basis of the longitudinal direction, and
the optical compensation film satisfies the following optical properties within a plane through which the normal line of the optical compensation film and the direction of 45° inclined from the longitudinal direction toward the in-plane refractive-index-reducing direction pass:
(i) a retardation value Re(0°) measured in the normal line direction using a light of wavelength 550 nm is in a range of 37±6 nm;
(ii) a retardation value Re(40°) measured in a direction inclined 40°, toward the plane of the optical compensation film, from the normal line using a light of wavelength 550 nm is in a range of 50±6 nm; and
(iii) a retardation value Re(−40°) measured in a direction inclined 40°, to the direction opposite to the direction of (ii), from the normal line using a light of wavelength 550 nm is in a range of 124±12 nm.

8. A liquid crystal display device, comprising:
a polarizing plate, and
a liquid crystal cell, having a liquid crystal layer, that is oriented in OCB mode,
wherein the product Δn×d of the thickness "d" of the liquid crystal layer and the refractive index anisotropy Δn of the liquid crystal is 500 nm to 800 nm,
the polarizing plate is produced by a method comprising laminating an optical compensation film, which being formed into a roll shape, with a polarizing film in a way of roll-to-roll,
the optical compensation film comprises a longitudinal direction and an in-plane refractive-index-reducing direction on the basis of the longitudinal direction, and
the optical compensation film satisfies the following optical properties within a plane through which the normal line of the optical compensation film and the direction of 45° inclined from the longitudinal direction toward the in-plane refractive-index-reducing direction pass:
(i) a retardation value Re(0°) measured in the normal line direction using a light of wavelength 550 nm is in a range of 37±6 nm;
(ii) a retardation value Re(40°) measured in a direction inclined 40°, toward the plane of the optical compensation film, from the normal line using a light of wavelength 550 nm is in a range of 50±6 nm; and
(iii) a retardation value Re(−40°) measured in a direction inclined 40°, to the direction opposite to the direction of (ii), from the normal line using a light of wavelength 550 nm is in a range of 124±12 nm.

9. A liquid crystal display device, comprising:
a polarizing plate, and
a liquid crystal cell, having a liquid crystal layer, that is oriented in HAN mode,
wherein the product Δn×d of the thickness "d" of the liquid crystal layer and the refractive index anisotropy Δn of the liquid crystal is 250 nm to 400 nm,
the polarizing plate is produced by a method comprising laminating an optical compensation film, which being formed into a roll shape, with a polarizing film in a way of roll-to-roll,
the optical compensation film comprises a longitudinal direction and an in-plane refractive-index-reducing direction on the basis of the longitudinal direction, and
the optical compensation film satisfies the following optical properties within a plane through which the normal line of the optical compensation film and the direction of 45° inclined from the longitudinal direction toward the in-plane refractive-index-reducing direction pass:
(i) a retardation value Re(0°) measured in the normal line direction using a light of wavelength 550 nm is in a range of 37±6 nm;
(ii) a retardation value Re(40°) measured in a direction inclined 40°, toward the plane of the optical compensation film, from the normal line using a light of wavelength 550 nm is in a range of 50±6 nm; and
(iii) a retardation value Re(−40°) measured in a direction inclined 40°, to the direction opposite to the direction of (ii), from the normal line using a light of wavelength 550 nm is in a range of 124±12 nm.

10. A polarizing plate, produced by a method comprising laminating a optical compensation film with a polarizing film,
wherein the optical compensation film comprises a longitudinal direction and an in-plane refractive-index-reducing direction on the basis of the longitudinal direction, and
the optical compensation film satisfies the following optical properties within a plane through which the normal line of the optical compensation film and the direction of 45° inclined from the longitudinal direction toward the in-plane refractive-index-reducing direction pass:
(i) a retardation value Re(0°) measured in the normal line direction using a light of wavelength 550 nm is in a range of 37±6 nm;
(ii) a retardation value Re(40°) measured in a direction inclined 40°, toward the plane of the optical compensation film, from the normal line using a light of wavelength 550 nm is in a range of 50±6 nm; and
(iii) a retardation value Re(−40°) measured in a direction inclined 40°, to the direction opposite to the direction of (ii), from the normal line using a light of wavelength 550 nm is in a range of 124±12 nm.

11. A liquid crystal display device, comprising:
a polarizing plate, and
a liquid crystal cell, having a liquid crystal layer, that is oriented in OCB mode, wherein the product Δn×d of the thickness "d" of the liquid crystal layer and the refractive index anisotropy Δn of the liquid crystal is 500 nm to 800 nm, the polarizing plate is produced by a method comprising laminating a optical compensation film with a polarizing film, the optical compensation film comprises a longitudinal direction and an in-plane refractive-index-reducing direction on the basis of the longitudinal direction, and the optical compensation film satisfies the following optical properties within a plane through which the normal line of the optical compensation film and the direction of 45° inclined from the longitudinal direction toward the in-plane refractive-index-reducing direction pass:

(i) a retardation value Re(0°) measured in the normal line direction using a light of wavelength 550 nm is in a range of 37±6 nm;

(ii) a retardation value Re(40°) measured in a direction inclined 40°, toward the plane of the optical compensation film, from the normal line using a light of wavelength 550 nm is in a range of 50±6 nm; and (iii) a retardation value Re(−40°) measured in a direction inclined 40°, to the direction opposite to the direction of (ii), from the normal line using a light of wavelength 550 nm is in a range of 124±12 nm.

12. A liquid crystal display device, comprising:

a polarizing plate, and a liquid crystal cell, having a liquid crystal layer, that is oriented in HAN mode, wherein the product Δn×d of the thickness "d" of the liquid crystal layer and the refractive index anisotropy Δn of the liquid crystal is 250 nm to 400 nm, the polarizing plate is produced by a method comprising laminating a optical compensation film with a polarizing film, the optical compensation film comprises a longitudinal direction and an in-plane refractive-index-reducing direction on the basis of the longitudinal direction, and the optical compensation film satisfies the following optical properties within a plane through which the normal line of the optical compensation film and the direction of 45° inclined from the longitudinal direction toward the in-plane refractive-index-reducing direction pass:

(i) a retardation value Re(0°) measured in the normal line direction using a light of wavelength 550 nm is in a range of 37±6 nm;

(ii) a retardation value Re(40°) measured in a direction inclined 40°, toward the plane of the optical compensation film, from the normal line using a light of wavelength 550 nm is in a range of 50±6 nm; and (iii) a retardation value Re(−40°) measured in a direction inclined 40°, to the direction opposite to the direction of (ii), from the normal line using a light of wavelength 550 nm is in a range of 124±12 nm.

* * * * *